(12) United States Patent
Rothkopf et al.

(10) Patent No.: US 11,726,324 B2
(45) Date of Patent: Aug. 15, 2023

(54) DISPLAY SYSTEM

(71) Applicant: Apple Inc., Cupertino, CA (US)

(72) Inventors: Fletcher R. Rothkopf, Los Altos, CA (US); David A. Kalinowski, San Francisco, CA (US); Jae Hwang Lee, Los Gatos, CA (US); Avi Bar-Zeev, Oakland, CA (US); Grant H. Mulliken, Sunnyvale, CA (US); Paul Meade, San Mateo, CA (US); Nathanael D. Parkhill, Menlo Park, CA (US); Ray L. Chang, Saratoga, CA (US); Arthur Y. Zhang, San Jose, CA (US)

(73) Assignee: APPLE INC., Cupertino, CA (US)

( * ) Notice: Subject to any disclaimer, the term of this patent is extended or adjusted under 35 U.S.C. 154(b) by 18 days.

(21) Appl. No.: 16/448,586

(22) Filed: Jun. 21, 2019

(65) Prior Publication Data

US 2020/0073122 A1     Mar. 5, 2020

Related U.S. Application Data

(60) Provisional application No. 62/725,529, filed on Aug. 31, 2018.

(51) Int. Cl.
   *G02B 27/01* (2006.01)
   *G09G 3/20* (2006.01)

(52) U.S. Cl.
   CPC .............. *G02B 27/017* (2013.01); *G09G 3/20* (2013.01); *G09G 2330/022* (2013.01); *G09G 2330/023* (2013.01)

(58) Field of Classification Search
   None
   See application file for complete search history.

(56) References Cited

U.S. PATENT DOCUMENTS

| | | | |
|---|---|---|---|
| 8,184,067 B1 | 5/2012 | Braun et al. | |
| 8,482,859 B2 | 7/2013 | Border et al. | |
| 8,686,924 B2 | 4/2014 | Braun et al. | |
| 9,152,378 B2 | 10/2015 | Jacobsen et al. | |
| 9,285,872 B1* | 3/2016 | Raffle | G06F 3/0346 |
| 9,620,144 B2 | 4/2017 | Parkinson et al. | |
| 10,572,270 B1* | 2/2020 | Sampath | G06F 1/1684 |
| 2009/0153540 A1* | 6/2009 | Blinzer | G06F 1/3203 345/212 |

(Continued)

FOREIGN PATENT DOCUMENTS

CN        104144377 A        11/2014

*Primary Examiner* — Christopher R Lamb
(74) *Attorney, Agent, or Firm* — Young Basile Hanlon & MacFarlane, P.C.

(57) ABSTRACT

A display system includes a head-mounted display unit and a wake control system. The head-mounted display unit provides content to a user and is operable in a low-power state and a high-power state that consumes more power to provide the content to the user than the low-power state. The wake control system determines when to operate in the high-power state. The wake control system may assess a first wake criterion with low power, assess a second wake criterion with higher power than the first wake criterion upon satisfaction of the first wake criterion, and cause the head-mounted display unit to operate in the high-power state upon satisfaction of the second wake criterion.

30 Claims, 13 Drawing Sheets

(56) References Cited

U.S. PATENT DOCUMENTS

| | | | |
|---|---|---|---|
| 2012/0159221 A1* | 6/2012 | Guddeti | G06F 1/3287 |
| | | | 713/323 |
| 2012/0200592 A1 | 8/2012 | Kimura | |
| 2014/0075230 A1* | 3/2014 | Suggs | H02J 7/35 |
| | | | 713/323 |
| 2014/0267208 A1 | 9/2014 | Yajima et al. | |
| 2014/0337036 A1 | 11/2014 | Haiut et al. | |
| 2015/0212647 A1 | 7/2015 | Kim et al. | |
| 2015/0220131 A1* | 8/2015 | Johansson | G06F 1/3231 |
| | | | 713/323 |
| 2015/0221278 A1* | 8/2015 | Le Grand | G06F 3/017 |
| | | | 345/156 |
| 2015/0301588 A1 | 10/2015 | Jeong et al. | |
| 2015/0360038 A1* | 12/2015 | Zottola | G02B 27/017 |
| | | | 607/45 |
| 2016/0162012 A1* | 6/2016 | Chang | G06F 1/3265 |
| | | | 345/211 |
| 2016/0171975 A1* | 6/2016 | Sun | G10L 15/32 |
| | | | 704/234 |
| 2017/0153672 A1 | 6/2017 | Shin et al. | |
| 2018/0341389 A1* | 11/2018 | Kim | G06F 1/3265 |

\* cited by examiner

DISPLAY SYSTEM

CROSS-REFERENCE TO RELATED APPLICATION(S)

This application claims priority to and the benefit of U.S. Provisional Patent Application No. 62/725,529, filed Aug. 31, 2018, the entire disclosure of which is incorporated by reference herein.

TECHNICAL FIELD

This disclosure relates to display systems and, in particular, control systems and methods for operating display systems that may be head-worn.

BACKGROUND

A display system may allow a user to perceive a real environment, while providing the user with content. For example, a head-mounted display unit (HMD), which is worn by a user on their head, allows the user to see and hear the real environment that they are present in and also provides content to the user visually and/or aurally.

It may be desirable for the head-mounted display unit to operate in and transition between modes of operation in which low power and high power is consumed (e.g., a low-power or sleep state and a high-power or awake state, respectively), for example, in providing the content to the user.

SUMMARY

Disclosed herein are implementations of display systems and control systems and control methodologies therefor.

A display system includes a head-mounted display and a wake control system. The head-mounted display provides content to a user and is operable in a low-power state and a high-power state that consumes more power to provide the content to the user than in the low-power state. The wake control system determines when to operate in the high-power state.

The wake control system may assess a first wake criterion with low power, assess a second wake criterion with higher power than the first wake criterion upon satisfaction of the first wake criterion, and cause the head-mounted display unit to operate in the high-power state upon satisfaction of the second wake criterion.

The wake control system may include a wake sensor device that senses the first wake criterion and a controller that causes the head-mounted display unit to operate in the high-power state. The wake sensor device assesses the first wake criterion independent of the controller and sends a wake control signal to the controller upon satisfaction of the first wake criterion. The controller initiates the wake control system to assess the second wake criterion upon receipt of the wake control signal.

The wake control system may assess a user wake criterion, assess an environmental wake criterion contemporaneously with assessing the user wake criterion. The environmental wake criterion is an environmental stimulus, and the user wake criterion is a user behavior that is reactionary to the environmental stimulus.

The wake control system may assess a communication criterion indicative of one of an incoming communication or content being available in a present environment of the user, provide a virtual stimulus with the head-mounted display unit upon satisfaction of the communication criterion, assess a user response criterion corresponding to the virtual stimulus, and cause the display system to operate in the high-power state upon satisfaction of the user response criterion. The communication criterion may be indicative of the incoming communication, and the virtual stimulus may be indicative of the incoming communication. The communication criterion may be indicative of content being available in the present environment, the communication criterion being one of visual recognition or receipt of a broadcast signal, and the content being associated with the present environment. The communication criterion may be visual recognition of one of an object or signage. The communication criterion may be receipt of a broadcast signal that is one of an infrared signal, an audio signal, or an RF signal.

The wake control system may sense a wake condition, compare the wake condition to multiple wake criteria, and cause the display system to operate in the high-power state upon satisfaction of any of the multiple wake criteria.

The wake control system may include a wake sensing device that senses the wake condition and a controller that causes the head-mounted display unit to operate in the high-power state. The wake sensing device compares the wake condition to each of the multiple wake criteria and sends a wake control signal to the controller upon satisfaction of any of the multiple wake criteria. The controller initiates the wake control system to cause the display system to operate in the high-power state upon receipt of the wake control signal by the controller.

The wake control system may present a list of the multiple wake criteria to the user, receive a selection of one or more of the multiple wake criteria from the user to form a subset of the wake criteria, compare the wake condition to the subset of the wake criteria, and cause the display system to operate in the high-power state upon satisfaction of any of the subset of the wake criteria.

The wake control system may evaluate wake accuracy of the multiple wake criteria, generate of a subset of the wake criteria from those of the multiple wake criteria determined to have high wake accuracy, compare the wake condition to the subset of the wake criteria, and cause the display system to operate in the high-power state upon satisfaction of any of the subset of the wake criteria. The wake accuracy is a measure indicating desirability of the user to operate in the high-power state after satisfaction of each of the multiple wake criteria.

The wake control system may present a list of accurate wake criteria to the user, receive a selection of one or more of the accurate wake criteria from the user to form a further subset of the wake criteria, compare the wake condition to the further subset of the wake criteria, and cause the display system to operate in the high-power state upon satisfaction of any of the further subset of the wake criteria.

The wake control system may assess a probabilistic condition, determine a wake sensing frequency according to the probabilistic condition, assess one or more wake criteria at the wake sensing frequency, and cause the display system to operate in the high-power state upon satisfaction of the one or more wake criteria.

The wake control system may assess a wake criterion to determine when to operate in the high-power state, assess a wake delay criterion contemporaneous with assessing the wake criterion, and delay operation of the head-mounted display in the high-power state upon satisfaction of both the wake criterion and the wake delay criterion.

The wake control system may determine when to operate in the high-power state according to satisfaction of one or more wake criteria that include one or more of: (a) a blinking criterion of blinking of one or more eyes of the user, (b) an eye movement criterion of movement of one or more eyes of the user, (c) a pupil criterion of changes of a pupil of one or more eyes of the user, (d) a head movement criterion of movement of a head of the user, (e) a facial movement criterion of movement of a face of the user, (f) a sound criterion of sound of an environment or of the user, (g) a communication criterion of one of receipt of an incoming communication, detection of an object in a present environment indicating availability of content from the environment, or receipt of a broadcast signal from the environment indicating availability of content from the environment, (h) a user response criterion of a response of the user to a virtual stimulus provided by the head-mounted display unit, (i) a combination of criteria that cooperatively indicate a biological condition of the user, or (j) a combination of criteria that include a user wake criterion corresponding to a user behavior and an environmental criterion corresponding to an environmental stimulus, the user behavior being responsive to the environmental stimulus.

The wake control system may evaluate wake accuracy of a first wake criterion threshold, determine an operative wake criterion threshold according the wake accuracy of the first wake criterion, assess a wake criterion according to the operative wake criterion threshold to determine when to operate in the high-power state, and operate in the high-power state upon satisfaction of the wake criterion threshold according to the operative wake criterion threshold. The operative wake criterion may be determined to be the first wake criterion threshold if the first wake criterion threshold is evaluated to have acceptable wake accuracy and to be different than the first wake criterion threshold if the first wake criterion is evaluated to have unacceptable wake accuracy.

DETAILED DESCRIPTION

Disclosed herein are embodiments of display systems, control systems, and methods of operation, which determine when to transition from a first state (e.g., a sleep mode or low-power state) to a second state (e.g., an awake mode or high-power state) in which differing amounts of content (e.g., computer-generated reality content (CGR content)) may be provided to the user and/or different functions may be performed. For example, in the first state, relatively little content (e.g., no content) may be provided to the user, while in the second state, greater content (e.g., more information and/or power-intensive graphics) may be provided to the user. The first state and the second state may also differ by other functionality afforded thereby, for example, according to the sensing of the user and the environment. In the first state, sensing may be limited to sensing conditions for determining when to operate in the second state, such as the user's intent and/or other conditions favorable for operating in the second state. In the second state, different sensing may be performed, for example, according to which content may be varied.

The systems and methods disclosed herein may be particularly advantageous for computer-generated reality, which may include "virtual reality," "mixed reality," and "augmented reality," as described below, in which CGR content, such as graphics, audio, and/or outputs for other senses, is provided to the user.

Figure 1A:
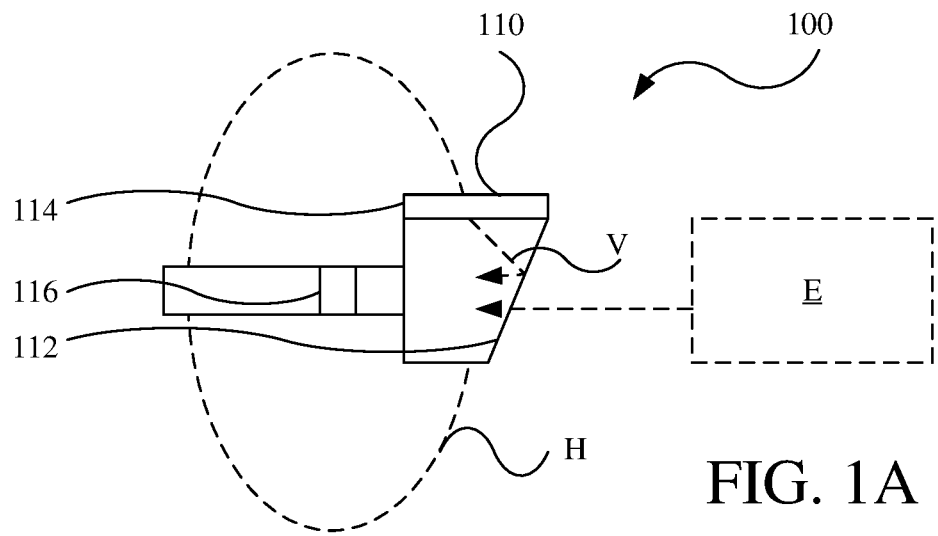
FIG. 1A is a schematic view of a display system having a head-mounted display unit.

Referring to FIGS. 1A-1D, a display system 100 includes a head-mounted display unit 110. As shown in FIG. 1A, the head-mounted display unit 110 (e.g., "HMD") is configured to be worn on a head H of a user and provides a visual pass-through, such that the user directly sees the real environment E, while also delivering CGR content to the user (e.g., graphics and/or audio). The CGR content is content generated and provided to the user, which may be related or associated with the real environment E (e.g., information about the real environment, navigation directions, graphics appearing to rest on or move over features of the real environment E) or may not be related to the real environment E (e.g., an incoming communication from another source, time of day). For example, the head-mounted display unit 110 includes a transparent lens 112 through which the user sees the real environment E, so as to provide an optical pass-through, and also includes a display 114 that projects the visual content V onto the transparent lens 112 to be reflected to eyes of the user. The head-mounted display unit 110 may instead provide a video pass-through by which the display shows the environment as captured by cameras. The head-mounted display unit 110 may also include an audio output device 116 (e.g., speakers or headphones) coupled to or otherwise associated therewith, which provides aural content to the user. The display system 100 may also be referred to as a head-mounted display system or an augmented reality system, while the head-mounted display unit 110 may be referred to as an augmented reality HMD.

Figure 1B:
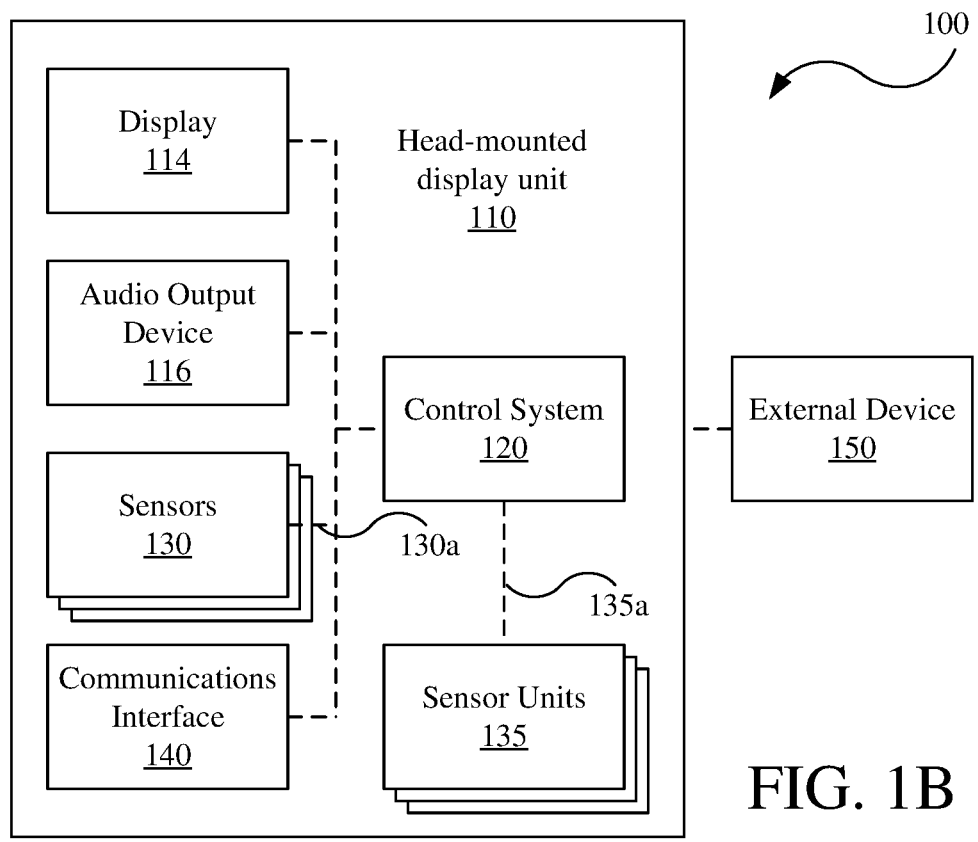
FIG. 1B is a schematic view of hardware components of the display system of FIG. 1A.

As shown in FIG. 1B, the head-mounted display unit 110 also includes a controller 120 and sensors 130, and may also include one or more sensor devices 135, and a communications interface 140. The display system 100 may also include an external device 150 in communication with the head-mounted display unit 110.

Referring to FIG. 1B, the controller 120 controls various operations of the display system 100, such as the display 114, the audio output device 116, and the sensors 130. The controller 120, while shown as part of the head-mounted display unit 110 may instead be an external device that is in communication (e.g., via a wired or wireless connection) for controlling various operations of the head-mounted display 110. The display system 100 may also include an external device 150 in communication therewith, such as a phone or other computing device associated with the user.

Figure 1C:
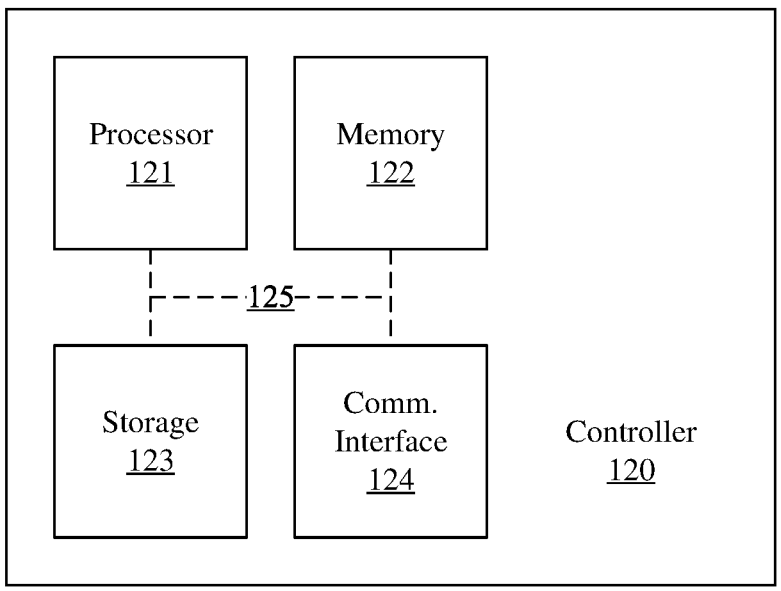
FIG. 1C is a schematic view of a hardware configuration of a controller of the display system of FIG. 1A.

Referring to FIG. 1C, an example hardware configuration for the controller 120 is shown. The controller 120 generally includes a processor 121, a memory 122, a storage 123, a communications interface 124, and a bus 125 providing communication therebetween. The processor 121 executes computer program instructions and performed operations described thereby. The processor 121 may be a central processing unit (CPU) or other conventional processing device. The memory 122 may be a short-term, high-speed, volatile information storage device, such as random-access memory (RAM). The storage 123 may be a long-term, non-volatile information storage device, such as a hard disk drive or a solid-state drive. The communications interface 124 sends and receives signals, for example, to control and/or receive signals from various other components of the display system 100 (e.g., to control output from the display 114 and to receive signals from the sensors 130).

Referring again to FIG. 1B, the sensors 130 and the wake sensor devices 135 sense conditions of the user, the head-mounted display unit 110, and/or the environment, which may be used in determining whether to operate in the high-power state and/or to vary content provided to the user. One or more of the sensors 130 may be dedicated to sensing those conditions for determining when to operate in the high-power state (e.g., wake conditions) and/or conditions while operating in the high-power state (e.g., for varying the content provided to the user). The wake sensor devices 135 may be dedicated to sensing wake conditions.

The sensors 130 may include M-number of sensors (e.g., one, two, three, five, ten, or more). Each of the sensors 130 may send sensor data signals 130*a*, which include sensor data that is processed by the controller 120 or another processing device to assess the criteria corresponding thereto. Generally speaking, assessing a criterion refers to sensing a condition and comparing the sensed condition to the criterion corresponding thereto.

Different types of sensors 130 may include audio sensors (e.g., microphones), motion or position sensors (e.g., accelerometers, gyroscopes, inertial measurement units (IMU), global positioning sensors (GPS), magnetometers), light sensors (e.g., ambient light sensors (ALS), photodiodes, light emitter and detector pairs), cameras, time of flight sensors (e.g., structured light sensors), force sensors, and electrode-based sensors (e.g., temperature sensors, biometric sensors, such as EEG, EMG), among others.

The sensors 130 are configured to sense different conditions, which may pertain to the user (i.e., user conditions), the environment (i.e., environmental conditions), and/or communications (i.e., communication conditions). User conditions may include voice, head movement, body movement, eye movement (e.g., gaze direction, blinking, pupil changes), muscle movement and/or activity (e.g., electromyography (EMG)), and biometric conditions (e.g., respiration and heart rate), among others. Environmental conditions may include sound, light, temperature, and altitude. Communication conditions may include signals, such as from receipt of incoming communications or detection of broadcast signals.

The conditions may be detected by a single sensor or single sensor type, such as one or more microphones for detecting sound (e.g., two microphones for stereoscopic detection of sound). Alternatively, conditions may be detected by a combination of sensors or different sensor types. For example, respiration may be sensed with a motion sensor (e.g., detecting movement of the user that occurs during breathing) in combination with a sound sensor (e.g., a microphone detecting sounds that occur during breathing), which may together be used to more reliably determine a breathing condition (e.g., inhale or exhale) than one sensor.

Figure 1D:
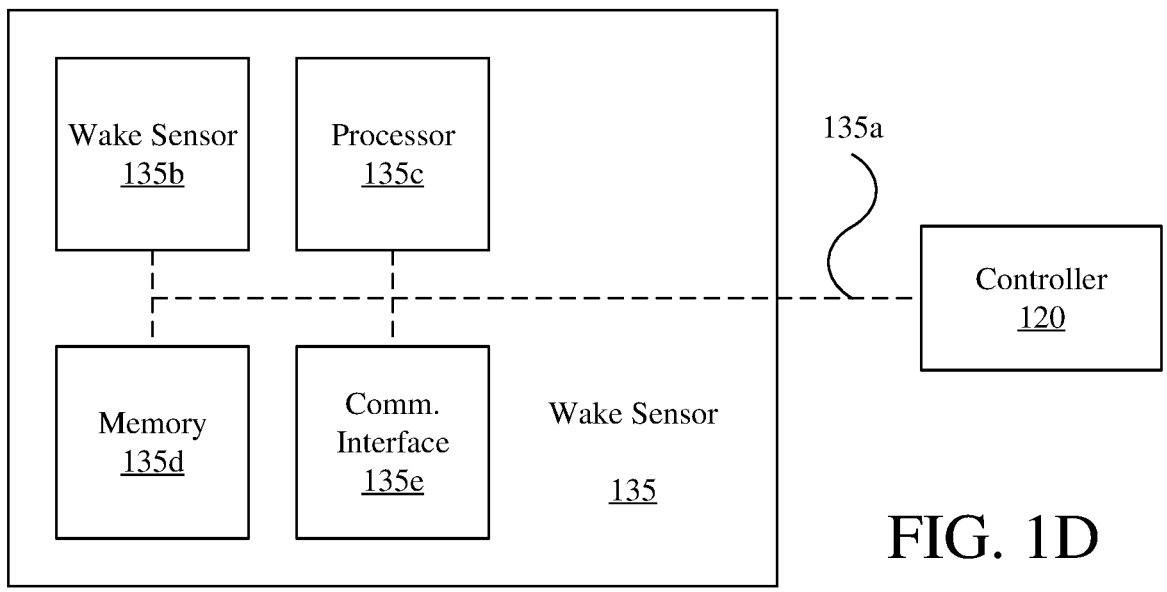
FIG. 1D is a schematic view of a wake sensor device of the display system of FIG. 1A.

Referring to FIG. 1D, the wake sensor device 135 is configured to assess a wake criterion and send wake control signals 135*a* generally independent of the controller 120. The wake sensor device 135 assesses the wake criterion by sensing the wake condition and comparing the wake condition to the wake criterion. By operating independent of the controller and other hardware components of the display system 100, the wake sensor device 135 may be configured to consume relatively low power to continually or more frequently observe wake conditions and initiate evaluation of further wake criteria with the sensors 130 or other wake sensor devices 135 that consume more power. Thus, the wake sensor device 135 functions as a distinct device, which assesses wake criteria and initiates pre-defined operation (e.g., assessment of another wake criterion) according thereto by sending a wake control signal 135*a*.

In one example hardware configuration, the wake sensor device 135 generally includes a wake sensor 135*b*, a processor 135*c*, a memory 135*d*, and a communications interface 135*e*. The wake sensor 135*b* senses a wake condition, and the processor 135*c* process signals received from the wake sensor 135*b* according to programming stored in the memory 135*d* to determine whether one or more wake criteria are satisfied. Upon satisfaction of the wake criteria, the processor 135*c* causes the communications interface 135*e* to send the wake control signal 135*a*, for example, to another wake sensor device 135 or the controller 120. The wake sensor device 135 may, for example, be configured as a system on a chip (SoC).

The wake sensor 135*b* of the wake sensor device 135 may be any of the types described above for the sensor 130 and is more preferably of a type that consumes relatively little power, while being operated continuously or at a high frequency. The wake sensor 135*b* may be configured to sense any of the conditions described above for the sensor 130.

Referring again to FIG. 1B, the communications interface 140 allows the display system 100 to send and/or receive signals to and/or from other devices, including other devices associated with the user (e.g., the external device 150) or other persons and/or devices in the immediate environment and/or located remotely from the user. The communications interface 140 may be part of the head-mounted display unit 110 (as shown schematically in FIG. 1A) or physically separate therefrom (e.g., if the controller 120 is physically separate from the head-mounted display unit 110).

The external device 150 is in communication with the controller 120 but is physically separate from the head-mounted display unit 110. The external device 150 may, for example, sense other conditions and/or otherwise communicate information to the controller 120. In one example, the external device 150 is a phone of the user.

Figure 2:
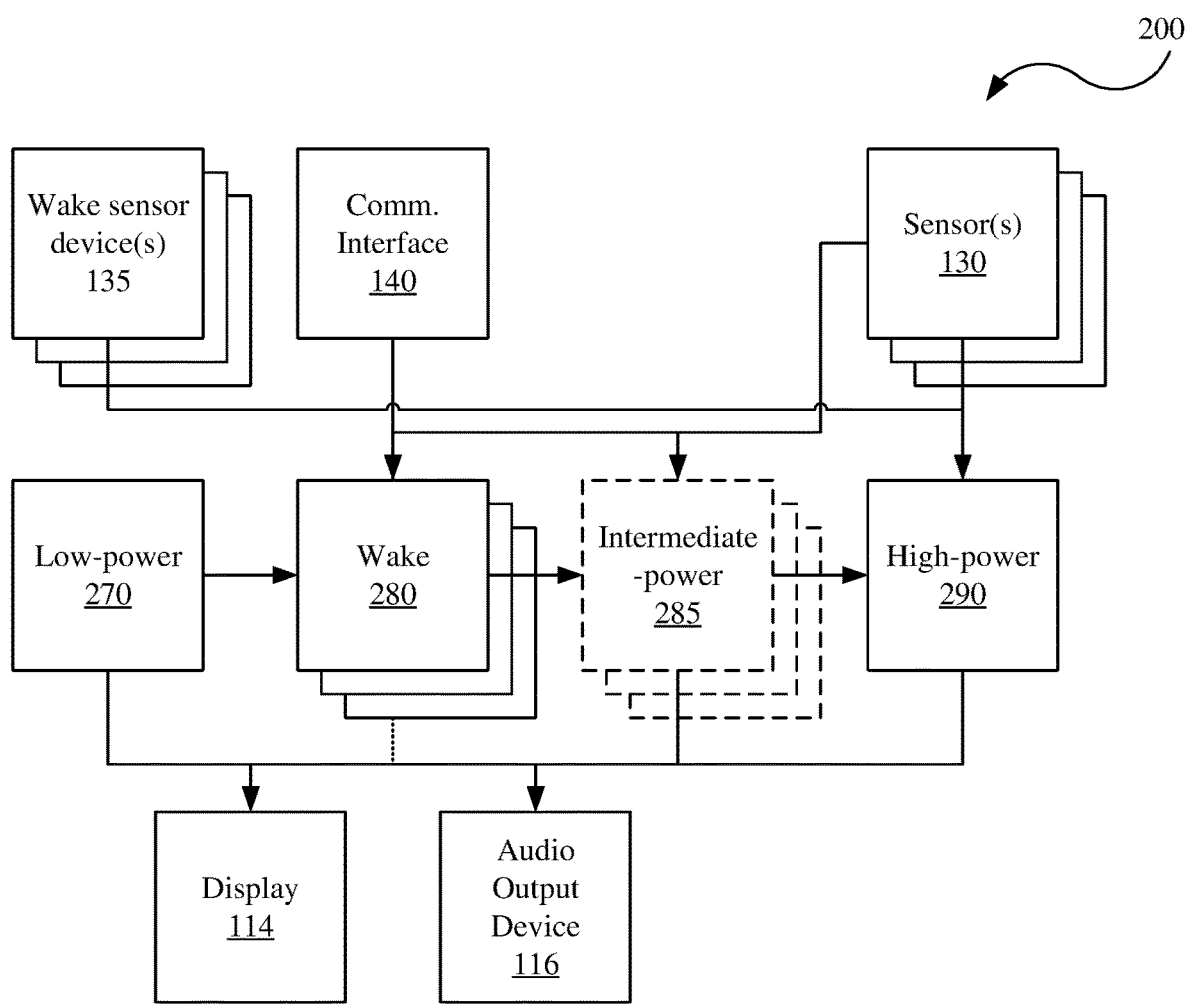
FIG. 2 is a schematic view of a control system of the display system of FIG. 1A, including hardware components and software units.

Referring to FIG. 2, the display system 100 includes a wake control system 200 that is implemented by the various components described above to determine when to transition from a low-power state to a high-power state. The wake control system 200 generally includes a low-power unit 270, one or more wake units 280, and a high-power unit 290. The wake control system 200 may be implemented, in part, using a computing device of any type, such as a computing device that includes a memory, a processor, and program instructions that are stored in the memory and cause the processor to perform actions when executed. As examples, the low-power unit 270, the wake units 280, and the high-power unit 290 may be implemented by providing one or more computing devices with executable program instructions that cause the functions described herein to be performed by the one or more computing devices. The one or more computing devices may, for example, be the controller 120. In the case of the wake units 280 being performed by the wake sensor device 135, the wake sensor device 135 itself includes the computing device.

The display system 100 may further be operable in one or more additional power states, such as additional high-power states that provide different CGR content and/or functionality (e.g., having additional high-power units 290) and/or intermediate-power states (e.g., the wake control system 200 having one or more intermediate-power units 285 with dashed lines). The multiple high-power states may have the same or different power consumption as each other. The intermediate-power states have lower power consumption compared to the high-power state (e.g., reduced display, sensing, and/or computing power consumption), be performed temporally between the low-power state and the high-power state (e.g., the display system 100 transitions first from the low-power state to the intermediate-power state and subsequently to the high-power state), and/or have unrelated or related functionality with the high-power state. The wake control system 200 further determines when to transition from the low-power state to the intermediate power-state and/or from the intermediate-power state to the high-power state.

The display system 100 is operated in the low-power state according to the low-power unit 270. In the low-power state, the display system 100 may, for example, provide CGR content and/or functionality that requires lower power consumption than in the high-power state. For example, the low-power content may include providing no CGR content (e.g., no visual content via the display 114 and no aural content via the audio output device 116) or non-power intensive graphics or audio with the display 114 and the audio output device 116. Non-power intensive graphics may be those which require low computing power and/or low display power, including some static graphics, such as the time of day. The low-power functionality may, for example, include using only low-power sensors 130 and/or sensor devices 135 in early steps for determining whether to operate in the high-power state (e.g., according to one of the wake modules 280). In applications in which the low-power state includes providing no or low-power content, the low-power state may instead be referred to as a low content state, while the low-power unit 270 may be referred to as a low content unit.

The display system 100 is operated according to the one or more wake units 280 by which one or more wake criteria are evaluated to determine when to operate in the high-power state. The wake criteria may be used to determine the user's intent and/or other circumstances in which operating in the high-power state would be desirable. One or more of the sensors 130, the sensor devices 135, and/or the communications interface 140 sense conditions and provide inputs to the wake unit 280. Generally speaking, each of the wake units 280 includes sensing a condition (e.g., of the user, the head-mounted display unit 110, or the environment) and comparing the condition to the wake criterion, so as to assess the wake criterion. The wake criterion may be evaluated, for example, with one or more of the sensors 130 in conjunction with a computing device (e.g., the controller 120), or by the wake sensor device 135 alone.

In a first example, the wake unit 280 assesses a blinking criterion of blinking of one or more of the user's eyes. The blinking criteria may, for example, be a blinking pattern, such as a double blink (e.g., successive blinks), an extended blink (e.g., closing one's eye for longer than a non-volitional duration), a blink of only one eye (e.g., a wink), a squint (e.g., partial closure of one's eyes), among others. The blinking condition may be sensed by an ambient light sensor, an LED-photodiode pair, a camera, or an EMG sensor. The ambient light sensor may detect a blink based on a change of light detected thereby (e.g., with more light being reflected by the user's eye than by their eye lid). The camera captures an image that is processed (e.g., with object recognition to sense the blinking condition) or that provides another output indicating the blinking condition. The electromyography (EMG) sensor may sense muscle stimuli that indicate the blinking condition. The blinking condition may be an explicit input by the user (e.g., a gesture command), which is subtle and be unnoticed by others when performed.

In a second example, the wake unit 280 assesses a gaze criterion of one or more of the user's eyes. The gaze criterion may, for example, be an eye movement, such as the direction, magnitude (e.g., gazing into periphery), and/or duration of the user's eyes, or any eye movement pattern (e.g., sequence of movements). The gaze condition may be sensed by a camera that captures images that are subsequently processed (e.g., with object recognition to sense the eye movement). The gaze condition may be an explicit input by the user (e.g., a gestured command), which may be subtle and be unnoticed by others.

In a third example, the wake unit 280 assesses a pupil criterion of one or more of the user's eyes. The pupil criterion may, for example, be a change in size of the pupil, such as a slight increase in pupil diameter. The pupil size condition may be sensed, for example, by a camera having successive images that are processed to determine changes pupil size (e.g., with object recognition).

A slight change in pupil diameter may immediately precede a decision being made by the user, thus may be used as a precondition for operating other sensors and/or may be used as an input variable in assessing another condition. For example, a detected change in pupil size may confirm a subsequent blink as being an intended gesture of the user, whereas non-detection of a change in pupil size may reject a subsequent blink as being an unintended gesture, for example, if the blink were instead caused otherwise (e.g., as a non-volitional act).

In a fourth example, the wake unit 280 assesses a sound criterion. The sound criterion may be of the user or of the environment. The sound condition may be sensed by one or more microphones. Sound captured by the microphone is processed, for example, for voice recognition (e.g., detecting a human voice, identifying the source of the human voice (e.g., of the user), and/or determining the words spoken), biometric detection (e.g., sound of breathing), and/or sound directionality (e.g., the location of the sound using stereo microphones and sound magnitude). In a specific example, the sound condition may be an intended sound command, which may be one or more spoken words (e.g., "wake up") or other sound generated by the user (e.g., non-word sounds, such as humming, whistling, coughing, "umm", "hmm," "uh," or other volitional sound made by the user). The sound criterion may be an unintended sound condition, such as sounds occurring in the environment, such as from another person or other sound sources in the environment.

In a fifth example, the wake unit 280 assesses a head movement criterion. The head movement criterion may, for example, be a turning or tilting of one's head by a certain magnitude, direction and/or duration, or a head movement pattern (e.g., combination of movements). In one specific example, the head movement criterion is tilting one's head for a duration (e.g., tilt and hold). The head movement condition may be sensed by the movement sensors (e.g., gyro, accelerometer, and/or IMU). The head movement condition may be an intended movement command (e.g., a head movement gesture).

In a sixth example, the wake unit 280 assesses a facial movement criterion. The facial criterion may, for example, be particular movements of one or more particular facial parts (e.g., nose, eyebrow, ear, mouth, forehead) or be a facial expression (e.g., smile, frown, surprised, etc.). In specific examples, the facial movement may be clenching of one's teeth, enlarging of eyes, or raising of eyebrows. In other examples, the facial expression may performable by a limited subset of people, such as wiggling of ears. The facial movement condition may, for example, be sensed by a camera (e.g., using object recognition), or EMG sensors detecting muscle movement. The facial movement criterion may be satisfied by an intended facial movement command (e.g., a facial gesture), or by a reactive facial movement condition (e.g., a reactionary indicator).

In a seventh example, the wake unit 280 assesses a communication criterion. The communication criterion may, for example, be satisfied by receipt of a signal or recognition of an indicator as to availability of a communication or other CGR content being available. For example, the communication criterion may be receipt of an incoming communication from another person (e.g., a phone call or text message). In another example, the communication criterion may be associated with the environment, such as detection of an object (e.g., visual detection a QR code, signage, or other object) or a broadcast signal (e.g., a light signal, such as infrared (IR) signal or pattern, audio signal, such as an inaudible signal or tone, or RF signal), which indicates that a communication or other CGR content is available (e.g., an advertisement from a nearby store or description of a historical monument). The communication condition may be received by the communications interface 140 or be detected by one of the sensors 130 or the wake sensor device 135 (e.g., cameras, light detection devices, microphones). The communication criterion may also be prefiltered by the user, such that satisfaction of only some communication criteria may be used in the wake determination (e.g., the user selects to receive calls only at certain times and/or from certain people, and/or selects to receive content or communications only from certain types of venues or from certain businesses).

In an eighth example, the wake unit 280 assesses a user response criterion. For example, the display system 100 may provide a virtual stimulus (e.g., a visual cue and/or an audio cue), which may indicate the availability of content to be provided in the high-power state. Such content may be available based on the user location (e.g., advertising content while in a store), facing direction of the user (e.g., informative content while in a museum), or a signal from an external source (e.g., a communication notification from another person or device; communication from the user location, such as in the store or museum example above). The user responsive condition may be directionally associated with the virtual stimulus (e.g., a visual target), such as an eye movement condition (e.g., focus on a visual cue indicating the availability of content), a head movement condition (e.g., toward the visual cue and/or toward an audio cue), or combination thereof (e.g., turning head toward visual or audio cue, while moving eyes to maintain gaze direction in real space), which are detected by appropriate sensors. The user responsive condition may not be directionally associated with the cue, such as a blinking condition (e.g., a long blink and a double blink to accept or reject, respectively, or vice versa). A non-response (e.g., not satisfying the user responsive criterion by not detecting the user responsive condition within a time lapse) may also be used to reject (e.g., confirm intent to not access) the available content.

As referenced above, the criterion may be satisfied by a combination of conditions. In a ninth example, the wake unit 280 assesses a breathing criterion. The breathing criterion may, for example, be an inhale or an exhale, the beginning and ending thereof, or a pattern of inhales and/or exhales. The breathing criterion may be satisfied by a combination of a sound condition and a movement condition, such as a breathing sound being sensed by a microphone and a head movement sensed by the motion sensor (e.g., lifting and lowering of one's head with an inhale and/or exhale).

In a tenth example, the wake unit 280 assesses a combination of user criteria simultaneously. For example, the user criteria may include an eye criterion (e.g., gaze direction) and a head movement criterion (e.g., turning head), such as gazing in one direction and turning one's head in an opposite direction (e.g., if the user's eyes remain focused on an object in real space, while turning their head).

The control system 200 may make a wake determination by assessing any one of the wake criterion alone (e.g., by executing just one of the wake units 280 described above), or by assessing multiple wake criterion in conjunction with each other (e.g., by executing multiple ones of the wake units 280 described above). Various methods for making the wake determination with multiple wake criterion are described below with reference to FIGS. 4-10.

Referring still to FIG. 2, the display system 100 is operated in the high-power state according to the high-power unit 290. In the high-power state, the display system 100 may, for example, provide CGR content and/or functionality that requires higher power consumption than in the low-power state. Power intensive graphics and/or audio may be output with the display 114 and/or the audio output device 116, which may require more computing power (e.g., animations vs. static graphics, more information), more display output power (e.g., brighter, higher frame rate), and/or more sensing power (e.g., operating more and/or more powerful sensors according to which the CGR content is provided) than in the low-power state. Power intensive functionality may be provided with more and/or higher power sensors 130, which function as inputs to the high-power unit 290. In applications in which the high-power state includes providing high-power content, the high-power state may instead be referred to as a high content state, while the high-power unit 290 may be referred to as a high content unit.

As referenced above, the display system 100 may also be operated in one or more intermediate-power states according to the one or more intermediate-power units 285. In the intermediate-power state, the display system 100 provides CGR content and/or functionality that requires higher power consumption than in the low-power state but lesser power consumption than in the high-power state. The display system 100 is operated according to the one or more wake units 280 to determine when to operate in the intermediate-power state and/or when to transition from the intermediate-power state to the high-power state.

In one example, in the low-power state, the display system 100 displays graphics spatially-independent of the real environment (e.g., spatially unassociated with real features of the real environment) and, in the high-power state, displays the same or different graphics anchored or otherwise visually linked to the real environment (e.g., spatially associated with features of the real environment, as the real features move relative to the display 114). For example, the graphics may be displayed in a fixed location of the display 114 in the intermediate-power state and may be displayed to move with features of the real environment in the high-power state (e.g., as the feature moves or as the user moves). As compared to in the high-power state, in the intermediate-power state, the display system 100 may consume less power with the display 114 (e.g., by operating the display 114 at a lower frame rate (e.g., 60-90 fps) than a higher frame rate (e.g., 120 fps) that might be used to move the graphics at speeds matching movement of the real features observable by the user), consume less power with the sensors 130 (e.g., by operating fewer and/or different sensors for identifying and/or tracking the real features), and/or consume less power with the controller 120 or other computing device (e.g., by not processing sensor data and/or the graphics to be displayed in relation to the real features of the real environment). The graphics in the intermediate-power state and the high-power state may relate to the same or similar functionality (e.g., such as the same or different icons or graphics related to a common function, such as a virtual assistant that receives and executes verbal requests), or to different or unrelated functionality (e.g., the digital assistant in the intermediate-power state and object tracking and/or highlighting in the high-power state).

It should be noted that the various components and interconnections illustrated in FIG. 1A-2 may be optional (e.g., the wake sensor device 135 may be omitted).

Figure 3:
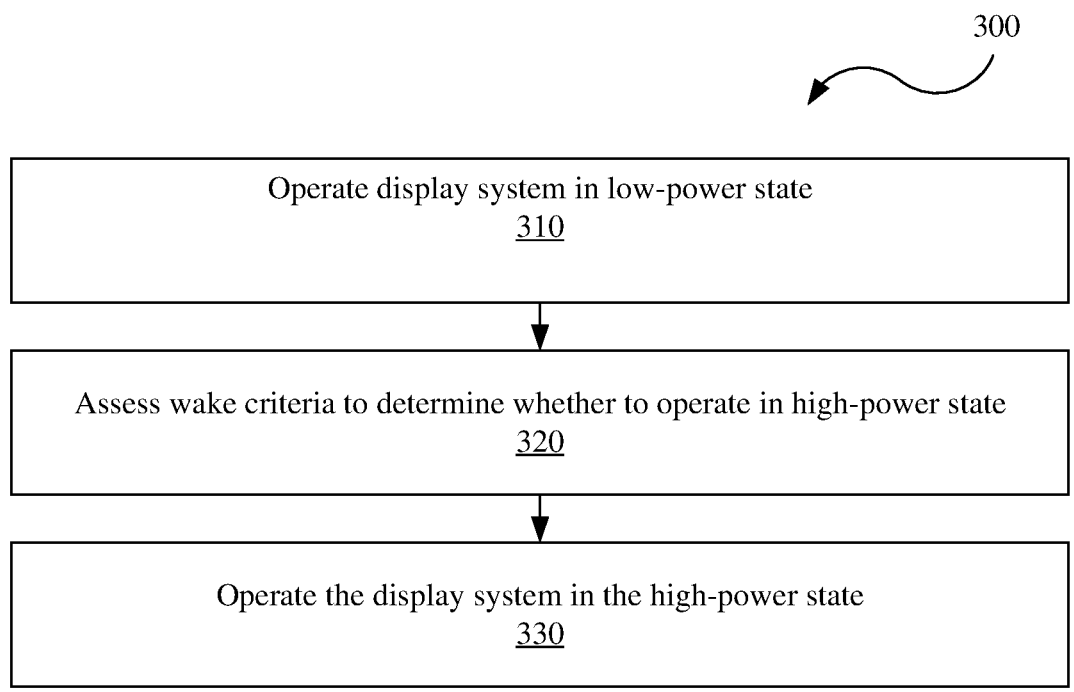
FIG. 3 is a flowchart of a method for operating the display system from a low-power state to a high-power state.

Referring to FIG. 3, a method 300 is provided for operating the display system 100 and, in particular, operating in the low-power state, determining when to operate in the high-power state, and subsequently operating in the high-power state. In a first operation 310, the display system 100 operates in the low-power state, for example, according to the low-power unit 270. For example, the display 114 and/or the audio output device 116 provide low content (e.g., no content). The first operation 310 may be referred to as a low-power or sleep operation.

In a second operation 320, the display system 100 determines whether to operate in the high-power state, for example, by assessing one or more wake criteria according to the one or more wake units 280 with various inputs from the sensors 130, the sensor devices 135, and/or the communications interface 140. The determination of whether to operate in the high-power state may be referred to as a wake determination. The second operation 320 of making the wake determination may be referred to as a wake determining operation. The second operation 320 or a portion thereof is performed simultaneous with the first operation 310, such that a wake criterion is evaluated simultaneous with operating in the low-power state.

In a third operation 330, the display system 100 operates in the high-power state, for example, according to the high-power unit 290. For example, the controller 120 causes the display 114 and/or the audio output device 116 to provide high content. The third operation 330 may be referred to as a high-power or high content operation.

A variation of the method 300 includes further operations associated with the intermediate-power state, such as determining whether to operate in the intermediate power state (e.g., according to one or more of the wake units 280), and operating in the intermediate-power state (e.g., according to one or more of the intermediate power units 285). The operations associated with the intermediate-power state may, for example, be performed temporally in the method 300 between the first operation 310 of operating in the low-power state and the second operation 320 of determining whether to operate in the high-power state, such that the display system 100 operates in the high-power state only after first operating in the intermediate-power state (indicated by a solid arrow in FIG. 2). Alternatively, the operations associated with the intermediate-power state may performed independent of the operations associated with the high-power state (e.g., in parallel with; indicated by a dashed arrow in FIG. 2), such that the display system 100 may transition from operating in the low-power state to the high-power state without first operating in the intermediate-power state.

Referring to FIGS. 4-12, various methods are discussed for performing the second operation 320 of assessing wake criteria to determine whether to operate in the high-power state.

Figure 4:
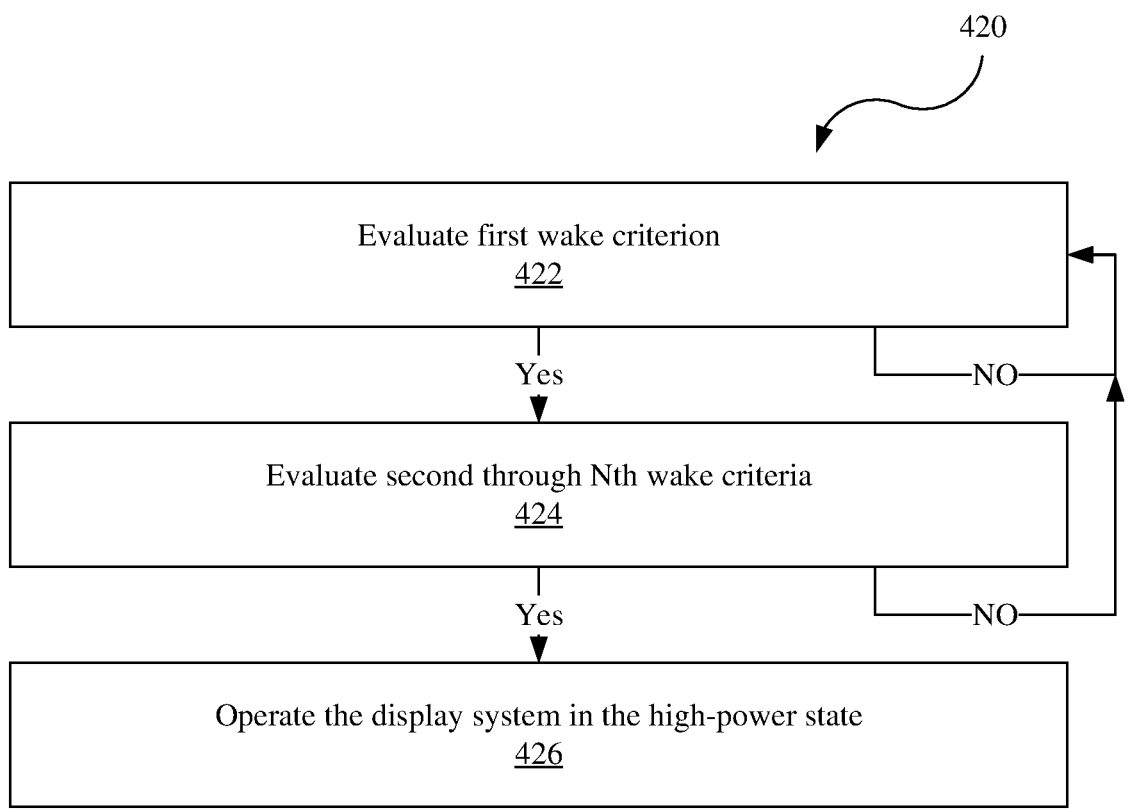
FIG. 4 is a flowchart of a method for determining whether to operate the display system in the high-power state.

Referring to FIG. 4, the wake determination may be made by assessing multiple criteria in succession. For example, a subsequent criterion may not be assessed until a prior criterion is satisfied. This successive approach may allow the display system 100 to conserve considerable power by assessing the prior wake criteria with relatively low power consumption and subsequently evaluating subsequent wake criteria with relatively high power consumption.

The power for evaluating the wake criteria may be consumed in sensing the condition (e.g., by the sensor 130 or the wake sensor 135b of the wake sensor device 135) and in processing the assessment (e.g., by the processor 121 of the controller 120 or the processor 135c of the wake sensor device 135). Relatively low-power sensors may, for example, include the audio sensors (e.g., microphone to sense audio conditions, such as sound from the user and/or the environment), motion sensors (e.g., accelerometers or an IMU sense movement conditions, such as movement of the head-mounted display unit 110 by the user), biometric sensors (e.g., sensors that measure certain biological conditions of the user, such as heart rate), and force sensors (e.g., to measure force of the user applied thereto, which may be used to sense user conditions such as facial movement or expressions). Other low-power sensors may include certain configurations of cameras (e.g., having very low resolution, such as 100 pixels) and/or light sensors.

Still referring to FIG. 4, the wake determination may be performed according to a method 420, which includes assessing N-number of wake criteria in sequence, where N is an integer of two or more.

The method 420 includes a first operation 422 of assessing a first wake criterion with low power (i.e., low energy consumption per unit time). The first operation 422 may be performed according to one the wake units 280 by the wake sensor device 135, or by the sensor 130 in conjunction with a processor (e.g., of the controller 120), sense a first wake condition and determining whether the first wake condition satisfies the first wake criterion (e.g., by comparing).

The first wake criterion may, for example, be one of the blinking gaze, pupil, sound, head movement, or facial movement criteria. The first wake criterion may be a user action that is imperceptible by the user (e.g., an involuntary action indicative of a user intent or other desirable circumstance for operating in the high-power state) and/or subtle or imperceptible by another person observing the user (e.g., so as to not be noticeable by the other person).

If the first wake criterion is not satisfied, the first operation 422 is repeated until satisfied. The first wake criterion is preferably assessed by continually sensing the first wake condition. For example, when in the low-power state, the sensor 130 or the sensor wake unit 135a may continually sense the first wake condition.

If the first wake criterion is satisfied, a second operation 424 of assessing a second wake criterion with high power is performed (i.e., higher energy consumption per unit time than the first operation 422). For example, if the first operation 422 is performed with the wake sensor device 135, the wake sensor device 135 may send the wake control signal 135a (e.g., to another wake sensor device 135 or to the controller 120) to initiate the second operation 424. If the first operation 422 is performed with the sensor 130, the controller 120 may initiate the second operation 424. Upon initiating the second operation 424, the first operation 422 may be stopped, so as to stop assessing the first wake criterion.

The second wake criterion is different than the first wake criterion. The second wake criterion may, for example, be another of the blinking gaze, pupil, sound, head movement, or facial movement criteria. The second wake criterion is preferably a user action that is imperceptible by the user (e.g., an involuntary action indicative of a user intent or other desirable circumstance for operating in the high-power state) and/or subtle or imperceptible by another person observing the user (e.g., so as to not be noticeable by the other person).

The second operation 424 may be performed according to another of the wake units 280 by the wake sensor device 135, or by another of the sensors 130 in conjunction with a processor (e.g., of the controller 120), by sensing a second wake condition and determining whether the second wake condition satisfies the second wake criterion.

If the second wake criterion is not satisfied, the second operation 424 may be stopped and the first operation 422 repeated.

If the second wake criterion is satisfied, a third operation 426 is performed, which may include operating the display system 100 in the high-power state (e.g., the third operation 330 of the method 300 according to the high-power unit 290). Further wake criteria (e.g., 3-N wake criteria) may be assessed in further operations in succession to and upon satisfaction of the second wake criterion (e.g., according to additional ones of the wake units 280). Such further wake criteria may require higher power consumption than the first operation 422 and/or the second operation 424. Upon satisfaction of the N-number of wake criteria.

Figure 5:
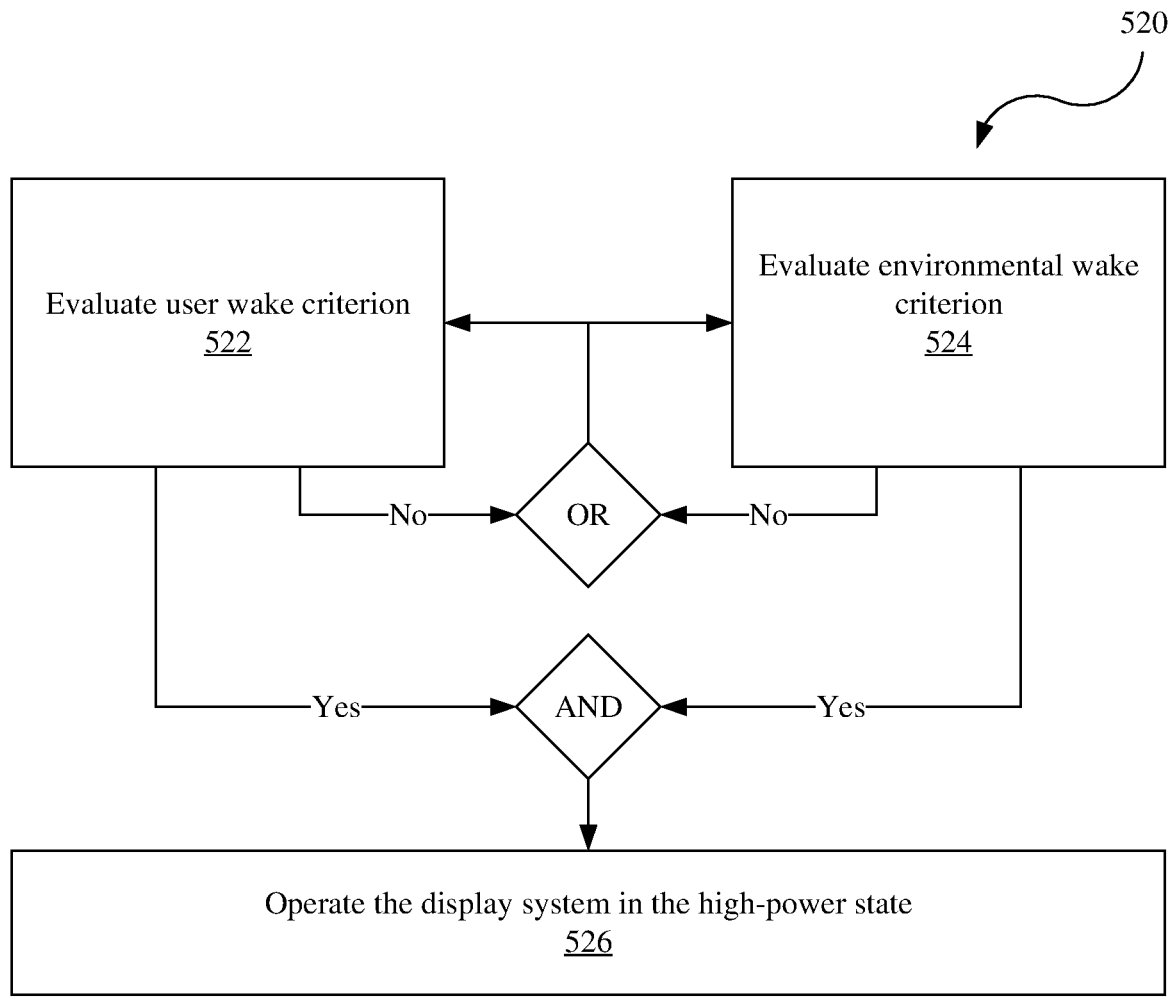
FIG. 5 is a flowchart of another method for determining whether to operate the display system in the high-power state.

Referring to FIG. 5, the wake determination may be made by assessing a user wake criterion and an environment wake criterion. For example, an environmental stimulus may be expected to induce user behavior that might satisfy the user wake criterion. In such cases, it may be beneficial to reject satisfaction of the user wake criterion because the user behavior does not indicate an intent of the user to operate in the high-power state. Alternatively, the environmental wake criterion may be used to confirm satisfaction of the user wake criterion because the user behavior suggests circumstances that may be of interest to the user. In a specific example, the user wake criterion may be a gaze criterion or a head movement criterion, while the environmental wake criterion may be a sound criterion (e.g., a sound originating from a particular direction corresponding to the gaze or head movement direction) or visual criterion (e.g., a movement or object corresponding to the gaze or head movement direction). In another example, the user wake criterion may be a blinking condition or pupil condition, while the environmental criterion is environmental light (e.g., when moving from bright to shaded areas)

Still referring to FIG. 5, the wake determination may be performed according to a method 520, which includes contemporaneously assessing a user wake criterion and an environmental wake criterion that may influence satisfaction of the user wake criterion. The user wake criterion may also be referred to as a user behavior criterion, while the environmental wake criterion may be referred to as an environmental stimulus criterion.

The method 520 includes a first operation 522 of assessing a user wake criterion. The first operation 522 is performed with a first sensor 130 in cooperation with a processor (e.g., the controller 120), or a sensor device 135, which senses the user wake condition and determines whether the user wake condition satisfies the user wake criterion.

The method 520 also includes a second operation 524 of assessing an environmental wake criterion. The second operation 524 is performed with a second sensor 130 in cooperation with a processor (e.g., the controller 120), or another sensor device 135, which senses the environmental wake condition and determines whether the environmental wake condition satisfies the environmental wake criterion. It should be noted that the control system may be configured for the environmental wake criterion to be satisfied by either the presence of the environmental wake condition (e.g., indicating circumstances that might be of interest to the user) or instead non-occurrence of the environmental wake condition (e.g., confirming user intent because the user wake criterion was not responsive to the environmental condition).

The second operation 524 is performed contemporaneous with the first operation 522, such as immediately before (e.g., the first operation 522 being performed upon satisfaction of the environmental wake criterion), simultaneous with, or immediately subsequent thereto (e.g., upon satisfaction of the user wake criterion). The second operation 524 is performed with a second sensor 130 in cooperation with a processor (e.g., the controller 120), or another sensor device 135, which senses the environmental wake condition and determines whether the environmental wake condition satisfies the environmental wake criterion.

If either the user wake criterion or the environmental wake criterion is not satisfied, the first operation 522 and the second operation 524 are repeated (e.g., being performed continuously).

If both the user wake criterion and the environmental wake criterion are satisfied, further operations are performed, which, as shown, may include a third operation 526 of operating the display system in the high-power state (e.g., according to the third operation 330 of the method 300 by the high-power unit 290). Alternatively, further wake criterion may be evaluated between the second operation 524 and the third operation 526 of operating in the high-power state.

The method 520 may be performed in conjunction with the method 420. For example, if the first operation 522 or the second operation 524 is performed before the other, the method 520 may be performed according to the method 420 with the latter operation having higher power consumption. In another example, another wake criterion requiring less power may be performed before the method 520, or another wake criterion requiring greater power may be performed after the method 520.

Figure 6:
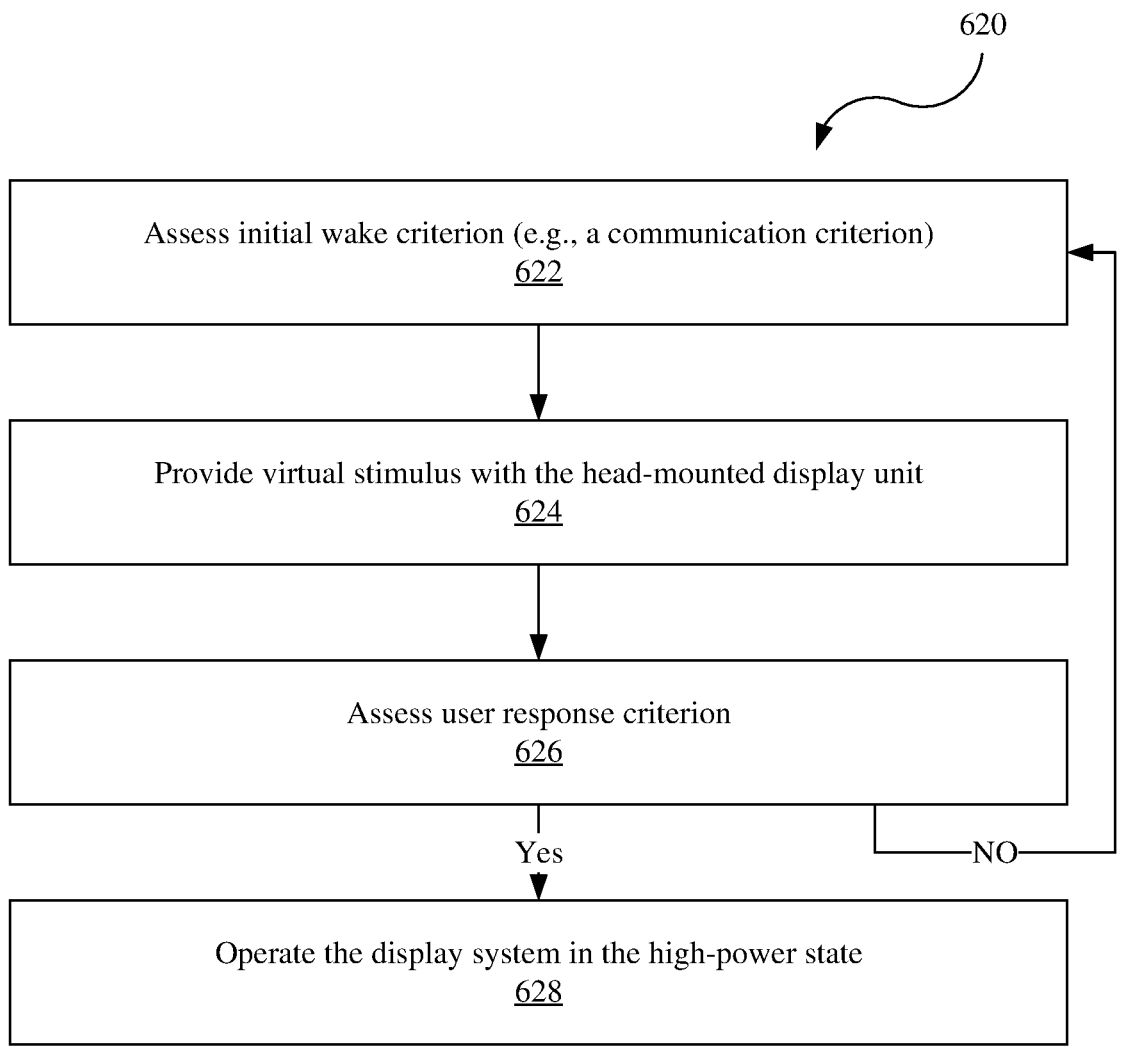
FIG. 6 is a flowchart of another method for determining whether to operate the display system in the high-power state.

Referring to FIG. 6, the wake determination may be made by providing a stimulus and assessing a user response criterion. The stimulus (e.g., visual or aural) may be provided to the user by the head-mounted display 110 in response to an earlier wake criterion being satisfied, which may be any of the user, environmental, or communication wake criteria described previously. The user response criterion may be spatially associated with the stimulus, for example, being a gaze criterion (e.g., the user looking at the stimulus, such as a displayed icon) or a head movement criterion (e.g., moving toward or away from the stimulus, such as a displayed icon or an audio stimulus). While providing the stimulus requires an additional and intentional action by the user, the stimulus may be less intrusive, distracting, or frustrating to the user than immediately operating in the high-power state.

Still referring to FIG. 6, the wake determination may be performed according to a method 620, which includes assessing a user response criterion in response to a virtual stimulus (e.g., a virtual indicator or a virtual cue).

The method 620 includes a first operation 622 of assessing an initial wake criterion. The first operation 622 is performed according to one of the wake units 280 with inputs from a first sensor 130 in cooperation with a processor (e.g., the controller 120), or a sensor device 135, which senses the initial wake criterion and determines whether the initial wake condition satisfies the initial wake criterion. The initial wake criterion may be one of the user, environmental, or communication wake criterion described previously. The first operation 622 may be performed with the communications interface 140 (e.g., in cooperation with a processor, such as of the controller 120), which receives an incoming communication signal from another communications device, for example, associated with another person or the environment of the user, which may be referred to as the present environment.

Particular examples of the initial wake criterion include communication criterion, such as receipt of a targeted communication signal with the communications interface 140 from a communications device associated with another person. As another example, the initial wake criterion may be detection of an image, an object, or a broadcast signal with one of the sensors 130, the wake sensor device 135, or the communications interface 140, which is associated with the environment of the user and indicates availability of CGR content. Such available CGR content be available from a device associated with the environment, which may transmit the CGR content to the display system 100 or otherwise cause the display system 100 to receive such CGR content for output thereby.

The method 620 includes an operation 624 of providing a virtual stimulus to the user with head-mounted display unit 110 (e.g., the display 114, the audio output device 116). The virtual stimulus is provided upon satisfaction of the initial wake criterion. The stimulus may be indicative of the initial wake criterion, such as being a visual icon indicating a type of communication (e.g., a phone icon, a message icon, an information icon, or an advertisement icon, such as a logo of a company associated with the advertisement). The stimulus may instead be aural, such as being an audible tone (e.g., different tones for different communication criterion). The stimulus may otherwise be displayed to indicate readiness of the display system to be selectively operated in the high content mode (e.g., displaying a light, which simply indicates readiness for monitoring the user response condition).

The method 620 includes a third operation 626 of assessing a user response criterion. The operation 624 may be performed according to one of the wake units 280 with inputs from a first sensor 130 in cooperation with a processor (e.g., the controller 120) or a sensor device 135, which senses the user response condition and determines whether the user response condition satisfies the user response criterion. The user response criterion may, for example, be a gaze criterion (e.g., gazing in a direction of a visual or audible stimulus, an eye movement pattern, an eye gesture to dismiss or accept a communication, such as by looking toward the right or the left, respectively).

If the user response criterion is not satisfied, the first operation 622 is repeated (e.g., is performed continuously).

If the user response criterion is satisfied, a fourth operation 628 is performed, which may include operating the display system in the high-power state (e.g., according to the third operation 330 of the method 300 by the high-power unit 290). Alternatively, further wake criterion may be assessed prior to the fourth operation 628 operating in the high-power state. In the case of the initial wake criterion being a communications criterion, the high-power state may include providing CGR content pertaining to the communication (e.g., images and/or sound from the other person or the environment).

The method 620 may also be performed in combination with the method 420 described previously. For example, a further operation of assessing another wake criterion with lower or higher power may be performed before or after, respectively, the operation 622 of assessing the initial wake criterion.

The method 620 may also be performed in combination with the method 520 described previously. For example, the operation 626 of assessing the user response criterion may be performed as the operation 522 of assessing the user wake criterion, which is performed contemporaneously with the operation 524 of assessing the environmental wake criterion. Thereby, the display system 100 may reject satisfaction of the user response criterion if the user condition might be the result of an environmental stimulus (e.g., a sound in the direction that might cause the user to gaze in a manner satisfying the gaze criterion).

The method 620 may also be performed in parallel with the first method 420 or the second method 520. For example, the method 620 may include assessing communication criterion as the initial wake criterion, while the first method 420 and/or the second method 520 may assess user or environmental criterion.

Figure 7:
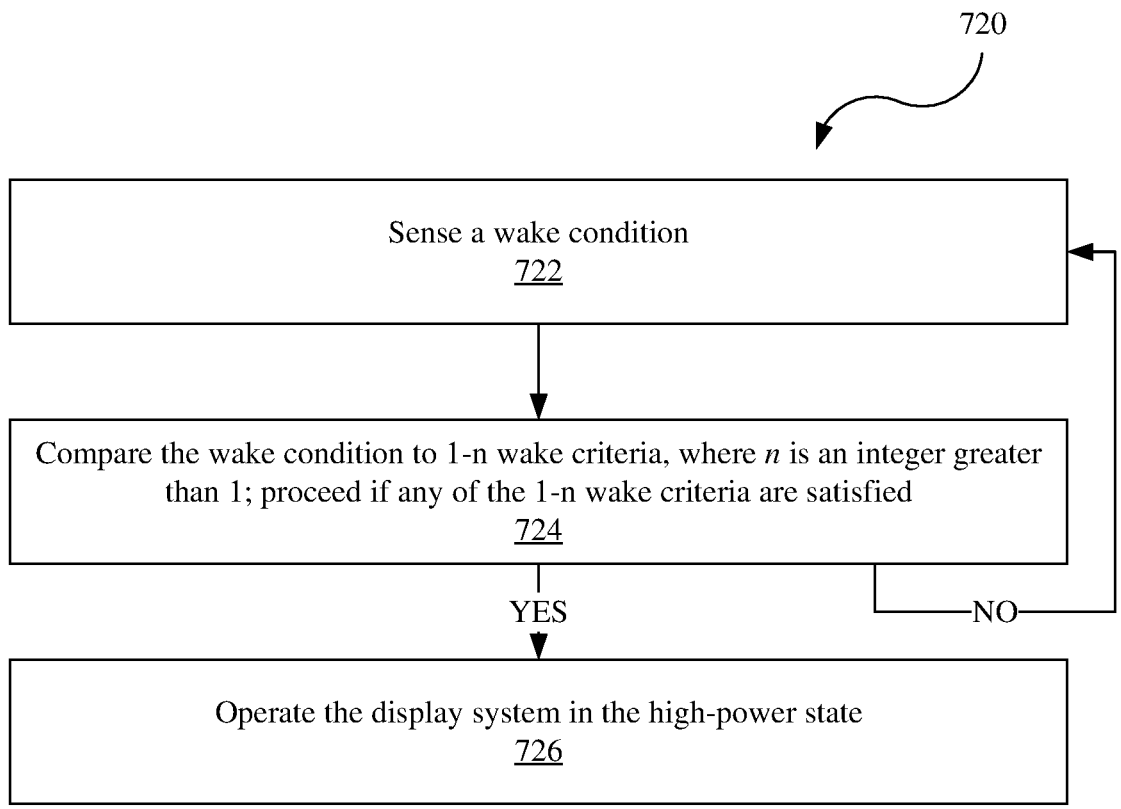
FIG. 7 is a flowchart of another method for determining whether to operate the display system in the high-power state.
Figure 8:
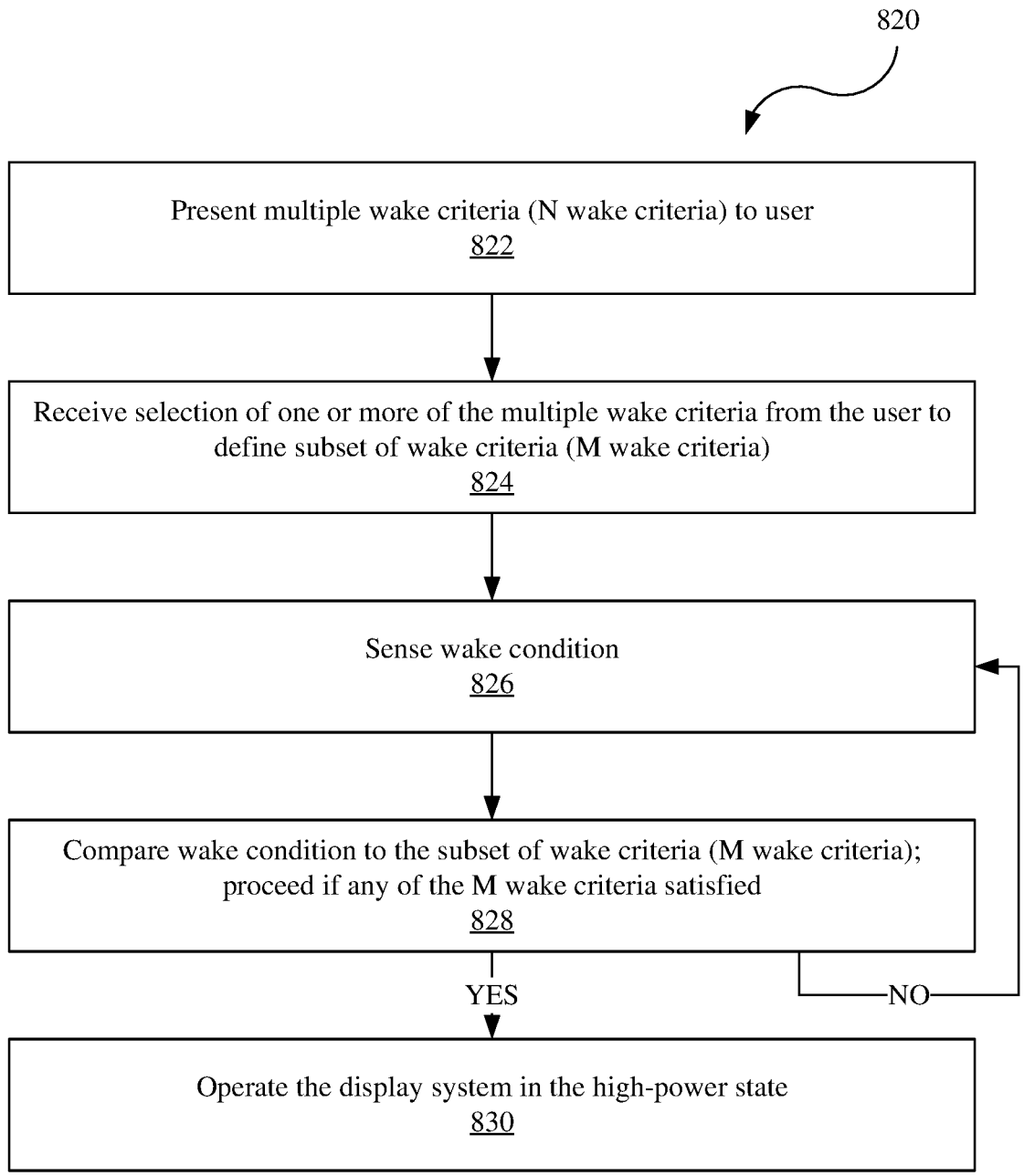
FIG. 8 is a flowchart of another method for determining whether to operate the display system in the high-power state.
Figure 9:
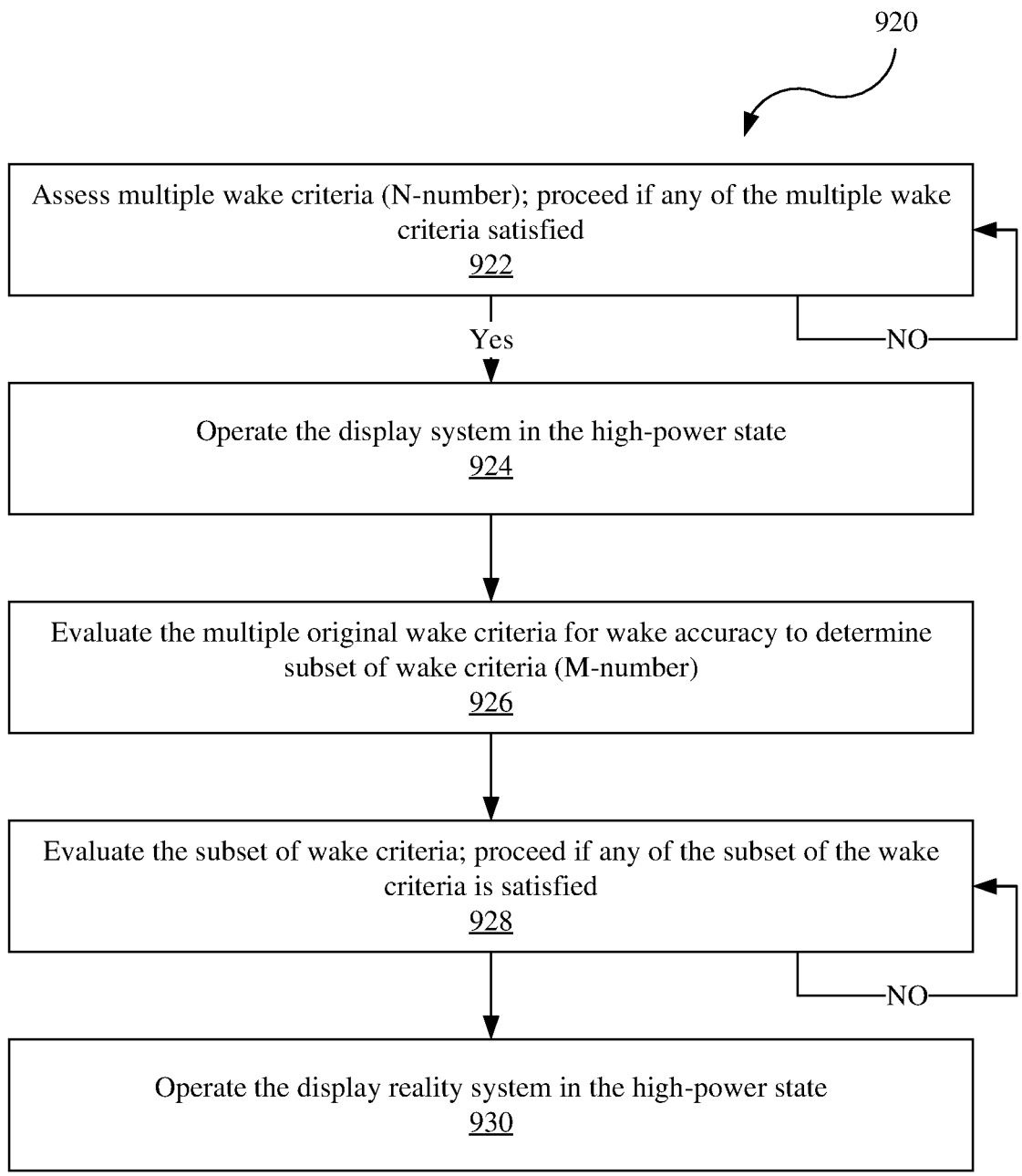
FIG. 9 is a flowchart of another method for determining whether to operate the display system in the high-power state.

Referring to FIGS. 7-9, the wake determination is made by comparing one wake condition against more than one wake criteria. For example, one type of wake condition may be sensed (e.g., eye gaze), while more than one wake criteria may be satisfied by the wake condition in different manners (e.g., gaze far left, gaze far up, gaze far right, gaze down, gaze pattern). This may allow the display system 100 to have improved wake accuracy by assessing more wake criteria, allowing the user to select wake criteria, or using wake criteria determined to have high wake accuracy.

Referring to FIG. 7, the wake determination may be made by satisfying any one of multiple wake criteria by sensing wake conditions of a common type (e.g., with a common sensor) and performing an additional function (e.g., operate in the high-power state, or assessing further wake criteria) if any of the multiple wake criteria is satisfied. By providing multiple wake criterion, the display system 100 may provide more robustness and/or more options for activating the high-power state with a single sensor 130 or wake sensor device 135 while in the low power state.

The wake determination may be performed according to a method 720, which includes a first operation 722 of sensing a wake condition, which may be performed by one of the sensors 130 or the sensor device 135. The wake condition may, for example, be eye blinking, eye movement, or head movement.

In a second operation 724, the wake condition is compared to multiple different wake criterion (e.g., N-number of wake criteria, where N is an integer greater than one). The second operation 724 is performed by a processor (e.g., of the controller with the sensor 130) or by the wake sensor device 135.

The multiple wake criteria may, for example, be multiple different eye blinking patterns (e.g., having different open/close duration and/or repeating), multiple different eye gazes (e.g., having different direction, magnitude, and/or pattern), or multiple different head movements (e.g., having different direction, magnitude, and/or pattern).

In the case of the first operation 722 of sensing being performed by the wake sensor device 135, the wake sensor device 135 sends the wake control signal 135a upon satisfaction of any one of the multiple wake criteria. The wake control signal 135a may be the same for each of the multiple wake criteria.

Alternatively, the wake control signal 135a may be different for different ones of the multiple wake criteria (e.g., each of the different wake control signals 135a corresponding to one or more of the multiple wake criteria). By sending different wake control signals 135a, different operations may be performed in response thereto (e.g., gestures for performing specific functions in the high-power state) and/or the wake control system 200 may learn which ones of the multiple wake criteria are more indicative of the user intent or circumstances in which the high-power state is desirable. Further discussion of this learning is discussed below with reference to FIG. 9.

If none of the multiple wake criteria are satisfied, the first operation 722 of sensing the wake condition is repeated. For example, the first operation 722 may be performed continually until any of the multiple wake criteria is satisfied.

If any of the multiple wake criteria is satisfied, a further operation is performed, which may include a third operation 726 of operating the display system in the high-power state (e.g., according to the third operation 330 of the method 300 by the high-power unit 290). Alternatively, further wake criterion may be assessed prior to the third operation 726 of operating in the high-power state.

The method 720 may be performed in conjunction with any of the methods 420, 520, and/or 620, described above. With respect to method 420, the operations 722, 724 may cooperatively perform either the operation 422 of assessing the criteria with low power or the operation 424 of assessing the criteria with high power. With respect to the method 520, the operations 722, 724 may cooperatively perform either the operation 522 of assessing the user wake criterion or the operation 524 of assessing the environmental wake criterion. With respect to the method 620, the operations 722, 724 may cooperatively perform either the operation 622 by evaluating multiple initial wake criteria or the operation 626 by assessing multiple user response criteria.

Referring to FIG. 8, the wake determination may be made by satisfying one or more wake criteria (e.g., user-selected wake criteria), which are selected by the user from a larger group of wake criteria (e.g., user-selectable wake criteria). By allowing the user to select which of the wake criteria by which the wake determination is made, greater wake accuracy and/or greater user satisfaction may be achieved.

The wake determination may be made according to a method 820, which includes a first operation 822 of presenting a list of N-number wake criteria to the user. The wake criteria may be any of the user wake criteria described previously (e.g., blink, eye movement, or head movement criteria). For example, the display system 100 may display a list of the N-number of wake criteria to the user.

In a second operation 824, a selection of one or more of the multiple wake criteria (e.g., N-number of wake criteria) is received from the user to form a subset of the wake criteria (e.g., M-number of wake criteria, where M is greater than L). The selected wake criteria may be referred to as a subset of the wake criteria or the user-selected wake criteria. The selection of the wake criteria may be received by one of the sensors 130 (e.g., a microphone).

The first operation 822 of presenting and the second operation 824 of selecting may be performed, for example, on an infrequent basis (e.g., during a set up operation by the user). For example, the first operation 822 and the second operation 824 may be performed according to a configuration unit (not shown), which includes software programming executed by a processor (e.g., of the controller 120).

In a third operation 826 and a fourth operation 828, the operations 722 of sensing the wake condition and 724 of assessing the wake criteria of the method 720, respectively, are performed for the subset of wake criteria. The sensing of the third operation 826 may be performed by the sensor 130 or the wake sensor device 135. In the case of the sensor 130 performing the third operation 826 of sensing the wake condition, the fourth operation 828 of assessing the subset of wake criteria is performed by a processor (e.g., of the controller 120).

In the case of the sensor device 135 performing the third operation 826 of sensing the wake condition, the fourth operation 828 is performed by the wake control unit 135 (e.g., by the processor 135c thereof). Furthermore, the wake sensor device 135 may output one wake control signal 135a upon satisfaction of any of the user selected wake criteria. For example, upon selection of the subset of the wake criteria, the wake sensor device 135 may be programmed to send the wake control signal 135a only upon satisfaction of one of the user selected wake criteria, such as by the controller 120 sending a program signal to the wake sensor device 135 by which the wake sensor device 135 is so programmed. Alternatively, the wake sensor device 135 may send different wake control signals 135a corresponding to each of the wake criteria, while the controller 120 initiates subsequent operations only upon receipt of those wake control signals 135a corresponding to the subset of the wake criteria.

If none of the subset of wake criteria is satisfied, the operation 826 is repeated, for example, being continuously performed until one of the subset of the wake criteria is satisfied.

If any of the subset of wake criteria is satisfied, further operations are performed, which, as shown, may include a fifth operation 830 of operating the display system in the high-power state (e.g., according to the third operation 330 of the method 300 by the high-power unit 290). Alternatively, further wake criterion may be evaluated prior to the fifth operation 830 of operating in the high-power state.

As with the method 720, the method 820 may be performed in conjunction with any of the methods 420, 520, 620 described above with the first operation 822 of presenting multiple wake criteria and the second operation 824 of receiving selection from the user being performed prior to the assessing, sensing, and comparing operations.

Referring to FIG. 9, the subset of wake criteria may be determined by learning behavior of the user. For example, the display system 100 may determine which of the wake criteria may have low wake accuracy if the user routinely does not operate in the high-power state after satisfaction of such wake criteria, such as if the user routinely subsequently instructs the display system 100 to operate in the low-power state and/or provides no instructions for operating in the high-power state (e.g., timing out). The wake criteria with low accuracy may, for example, be natural behaviors (e.g., mannerisms) that the user regularly performs in circumstances in which operating in the high-power state may be undesirable (e.g., false positives), which may be identified by reactive behavior (e.g., to operating in the high-power state) or by observing and identifying such natural behaviors at other times (e.g., sensing the wake conditions during the high-power state).

The wake determination may be made according to a method 920, which includes a first operation 922 assessing multiple wake criteria (e.g., N-number of wake criteria). The multiple wake criteria may be assessed by the sensor 130 in conjunction with a processor (e.g., of the controller 120) or by the wake sensor device 135. The multiple wake criteria may be any of the user, environmental, or communications wake criteria described previously, which are compared to a common type of wake condition.

If none of the multiple wake criteria is satisfied, the first operation 922 is repeated (e.g., continually performed).

If one of the multiple wake criteria is satisfied, a second operation 924 is performed, which includes performing another operation, such as the third operation 330 of the method 300 by operating the display system 100 in the high-power state. Other criteria may be assessed prior to operating in the high-power state (e.g., according to the methods 420, 520, 620 described previously).

In a third operation 926, after performing the first operation 922 and the second operation 924 multiple times, wake accuracy of the multiple wake criteria is evaluated. Wake accuracy is an evaluation of (e.g., a measure indicating) desirability of the user to operate in the high-power state after satisfaction of each of the multiple wake criteria, which may be based on user intent or other circumstances in which the second mode is desirable. The third operation 926 may be performed, for example, by the controller 120 according to a learning unit (not shown), which includes software programming executed by a processor (e.g., of the controller 120). The third operation 926 may be performed on an infrequent basis.

The wake accuracy of each of the multiple original wake criteria may be determined, for example, according to repeated behavior of the user after operating in the high-power state after satisfying any of the multiple wake criteria. Such user behavior may include user instructions to exit the high-power state or time lapse with no user input (e.g., not satisfying further user wake criteria), both of which may indicate lack of intent and/or undesirable conditions for the high-power state. The wake accuracy may instead or additionally be determined according to subsequent instructions of the user in the high-power state, which may indicate intent and/or desirable conditions for the high-power state. Those of the multiple wake criteria determined to not have low wake accuracy (e.g., determined to have high accuracy) may form the subset of the wake criteria (e.g., M-number). The subset of the wake criteria may also be referred to as learned wake criteria.

A fourth operation 928 includes assessing whether any of the subset of the wake criteria is satisfied. The fourth operation 928 is performed with the same sensor 130 or by the same sensor device 135, which performed the first operation 922.

In the case of the sensor device 135 performing the first operation 922 of sensing the wake condition, the wake sensor device 135 may output one wake control signal 135*a* upon satisfaction of any of the multiple wake criteria. For example, upon performing the third operation 926 of evaluating the wake accuracy of the multiple wake criteria, the wake sensor device 135 may be programmed to send the wake control signal 135*a* only upon satisfaction of one of the accurate wake criteria, such as by the controller 120 sending a program signal to the wake sensor device 135 by which the wake sensor device 135 is so programmed. Alternatively, the wake sensor device 135 may send different wake control signals 135*a* corresponding to each of the multiple wake criteria, while the controller 120 initiates subsequent operations only upon receipt of those wake control signals 135*a* corresponding to the subset of wake criteria.

If none of the subset of the wake criteria is satisfied, the fourth operation 928 is repeated (e.g., is performed continuously).

If one of the subset of the wake criteria is satisfied, a fifth operation 930 is performed, which includes performing another operation, such as the third operation 330 of the method 300 by operating the display system 100 in the high-power state. Other criteria may be assessed prior to operating in the high-power state (e.g., according to the methods 420, 520, 620 described previously).

As with the method 720 and the method 820, the method 920 may be performed in conjunction with any of the methods 420, 520, 620 described above with the third operation 926 of evaluating the multiple original wake criteria for wake accuracy being performed after performing the assessing, sensing, and comparing operations multiple times.

The method 920 may also be performed in conjunction with the method 820. For example, the operation 926 may be performed to develop a list of accurate wake criteria (M-number) from the multiple wake criteria (N-number), which is presented for selection by the user to form a further subset of the wake criteria (e.g., a user-selected accurate subset of the wake criteria; L-number, where L is less than M, which is less than N).

In a still further variation of the methods 820, 920, the display system may learn repeat unintentional behaviors of the user (e.g., mannerisms), some of which may satisfy different wake criteria, and suggest one or more different wake criteria that are not satisfied by the repeat unintentional behaviors. For example, the method 920 may be performed by omitting the first operation 922 and the second operation 924, while the third operation 926 is performed by assessing wake criteria to have low wake accuracy if satisfied by the repeat unintentional behaviors of the user.

Figure 10:
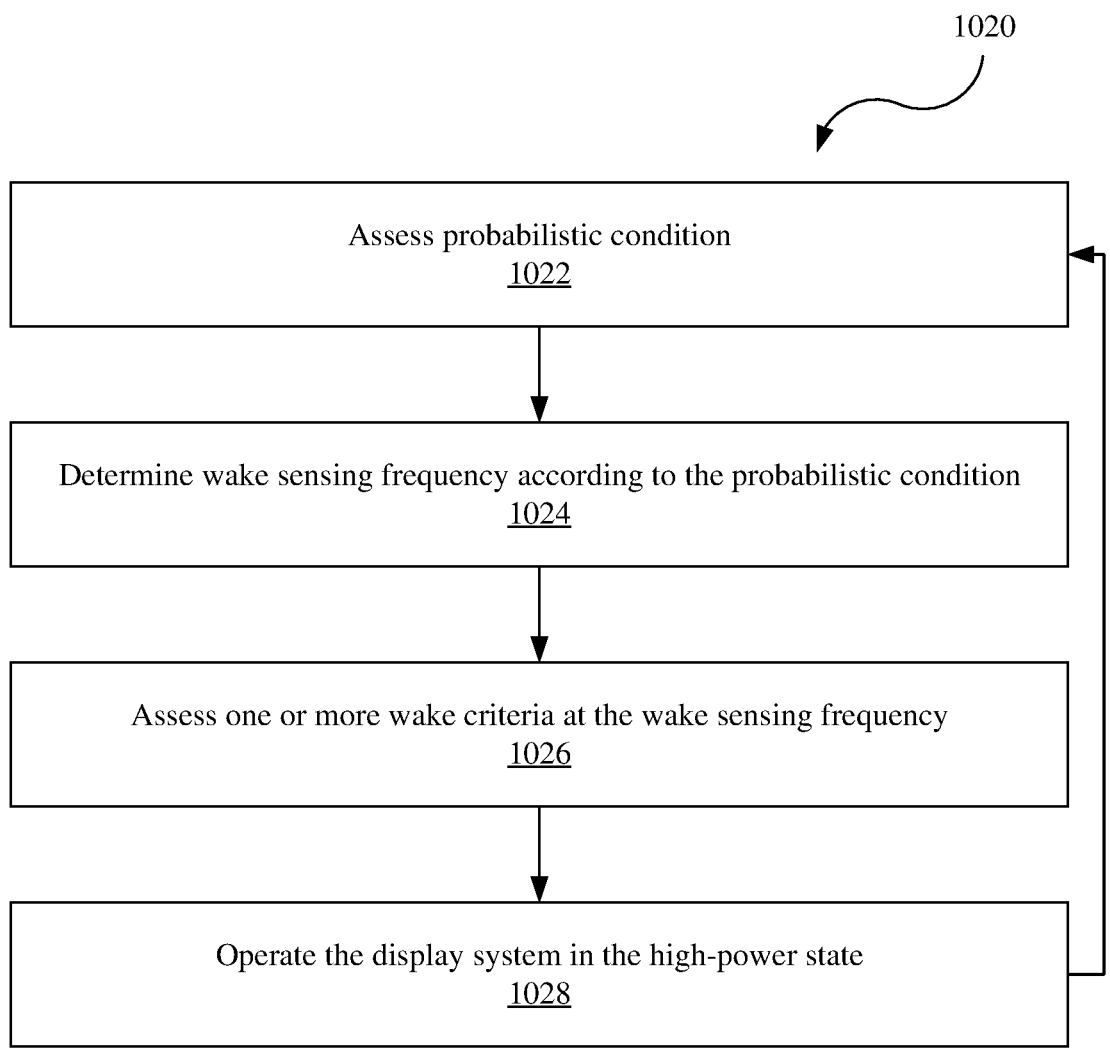
FIG. 10 is a flowchart of another method for determining whether to operate the display system in the high-power state.

Referring to FIG. 10, the wake control system 200 assesses one or more wake criteria on a probabilistic basis. For example, as compared to continually assessing a wake criterion (e.g., the operation 422), probabilistically assessing wake criteria is performed with varying time frequency. For example, in different conditions, various ones of the sensors 130 may be operated at different frequencies to sense different wake conditions (e.g., user, environmental, or communication) at different intervals (e.g., frequency). Such different conditions may be referred to as probabilistic conditions, which are preferably assessed with low power, and may include time of day (e.g., determined by a clock of the controller 120), location (e.g., received from GPS of an associated device, such as the user's phone), sound (e.g., general noise level), and activity or movement (e.g., magnitude and/or frequency). The probabilistic condition (e.g., time of day, location, sound, and activity) may be generally correlated with circumstances more likely to be desirable for operating in the high-power state but may not themselves indicate specific conditions in which operating in the high-power state would be desirable. For example, it may be desirable to operate in the high-power state during the user's commute, whereby a rush hour time of day (e.g., 5 pm to 7 pm) may be generally correlated to the user's commute but does not necessarily indicate that the user is commuting. Thus, during the rush hour time of day, the display system 100 may assess the wake criterion at shorter intervals than at other times of day.

Based on the probabilistic condition, various ones of the sensors 130 may be operated to assess various wake criterion at different intervals (e.g., frequency). For example, at different times of day (e.g., associated with rest or work), different locations (e.g., private vs. populated), sound (e.g., quiet vs. loud), and activity (e.g., small vs. large), the various sensors 130 may be operated with different intervals or frequency (e.g., respectively, long vs. short intervals) to sense various wake conditions for assessing the wake criteria.

Still referring to FIG. 10, the wake determination may be made according to a method 1020 on a probabilistic basis. In a first operation 1022, a probabilistic condition is assessed. The probabilistic condition is a condition, which may suggest a lower or higher likelihood that a wake criterion may be satisfied, such as time of day, location, sound, and/or activity or movement. One of the sensors 130, the sensor device 135, or the controller 120 itself (e.g., for time of day) is used to assess a probabilistic condition.

In a second operation 1024, a wake sensing frequency (e.g., a wake sensing interval) is determined. The wake sensing frequency may, for example, be determined based on the probabilistic condition according to a look up table.

In a third operation 1026, one or more wake criteria are assessed according to the wake sensing frequency. That is, the one or more wake criteria are assessed at the wake frequency (e.g., at the wake interval). The one or more wake criteria may be any of the wake criteria described previously. The one or more wake criteria may, preferably, require higher power consumption than assessing the probabilistic condition. When the one or more wake criteria are being sensed, the display system 100 may be considered to be in a high sensing state, while providing little or no CGR content.

If the one or more wake criteria are not satisfied, the wake criteria are assessed at the wake frequency.

If the one or more wake criteria are satisfied, a further operation 1028 is performed, which may include a further operation, such as operating the display system in the high-power state. Prior to operating in the high-power state, further wake criteria may be assessed.

The first operation 1022 may be performed repeatedly (e.g., continuously), such that upon detecting a change in the probabilistic condition, the second operation 1024 may determine a different wake sensing frequency.

The method 1020 may be performed with the methods 420, 520, 620, 720, 820, 920, for example, operating simultaneous and in parallel therewith. For example, the control system may simultaneously assess two or more wake criteria (e.g., according to the methods 420, 520, 720, 820, 920), a communication wake criterion (e.g., according to the method 620), and/or the probabilistic criterion (e.g., according to the method 1020).

Figure 11:
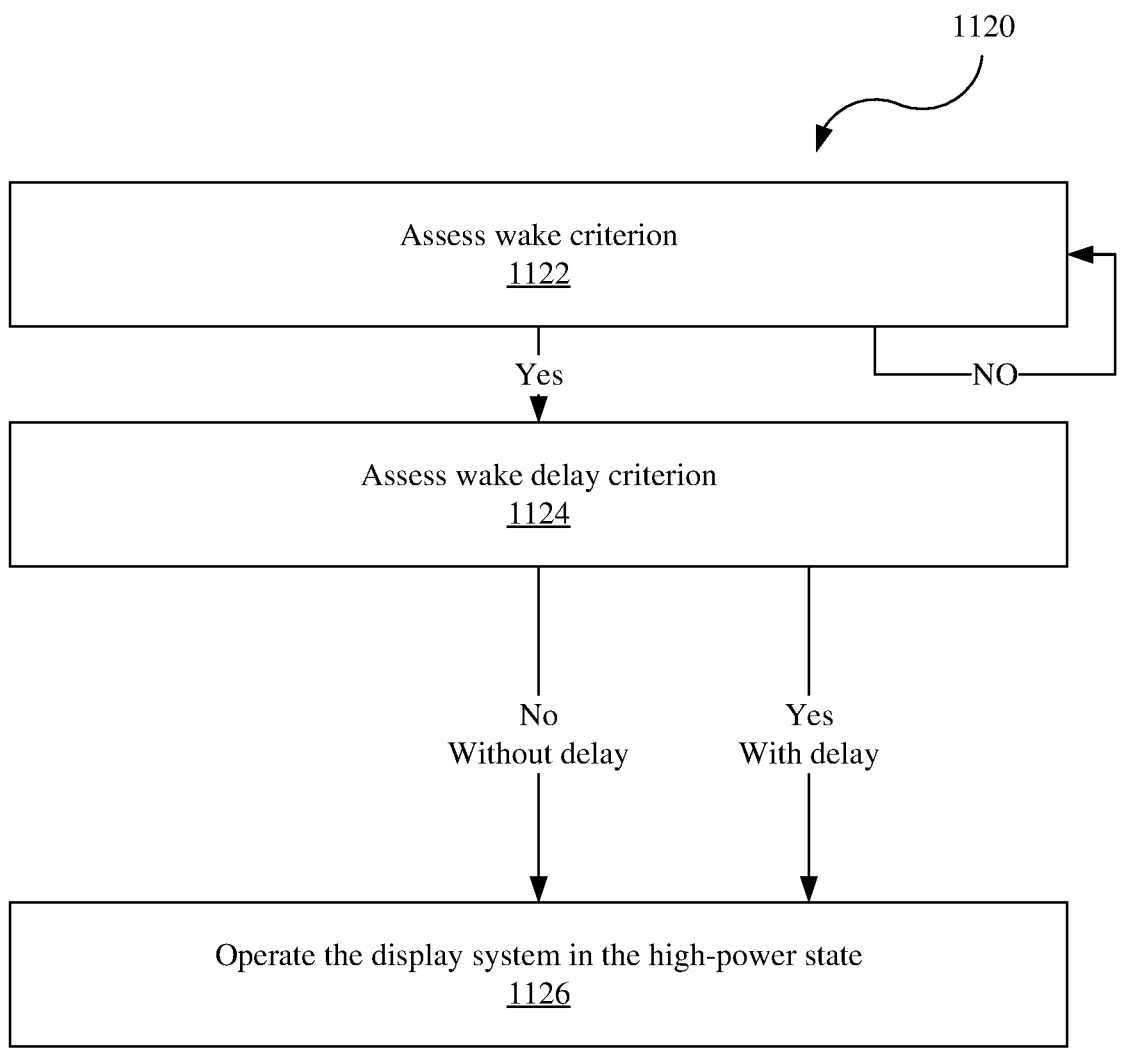
FIG. 11 is a flowchart of another method for determining whether to operate the display system in the high-power state.

Referring to FIG. 11, the wake control system 200 delays operating in the high-power state according to one or more wake criteria. For example, the control system 200 may make the wake determination, while other wake criteria (e.g., wake delay criteria) suggest that it may be in opportune to operate in the high-power state (e.g., in circumstances that might interrupt or distract the user). For example, while the user is in a conversation with another person, the user may be distracted by suddenly operating in the high-power state (e.g., by the CGR content provided to the user). Therefore, contemporaneous with making the wake determination, it may be beneficial assess one or more criteria suggestive of the conversation and, thereby, delay operating in the high-content state (e.g., based on a time delay or cessation of the condition satisfying the wake delay criterion).

Still referring to FIG. 11, a method 1120 is provided for delaying operating the head-mounted display in the high-power state. The method 1120 includes a first operation 1122 assessing a wake criterion, which may be performed according to any of the wake units 280 and/or the methods 420, 520, 620, 720, 820, 920, 1020 described previously. If the wake criterion is not satisfied, the operation 1120 is repeated (e.g., continuously).

In a second operation 1124, a wake delay criterion is assessed. The wake delay criterion may be assessed according to any of the wake units 280 described previously. The second operation 1124 is performed contemporaneous with the first operation 1122, such as simultaneous therewith or immediately thereafter (e.g., upon satisfaction of the wake criterion).

The wake delay criterion may, for example, be a breathing criterion (e.g., indicating that the user is speaking), a sound criterion (e.g., indicating that the user is speaking, or that another person is speaking to the user), or other suitable criterion. The wake delay criterion, for example, is satisfied if the wake delay condition is present and provides reason to not operate in the high-power state. The second operation 1124 is performed contemporaneous with the first operation 1122, such as simultaneous therewith or immediately thereafter.

In a third operation 1126, the display system 100 is operated in the high-power state, for example, according to the third operation 330 of the method 300 (e.g., according to the high-power unit 290). The third operation 1126 is performed without delay if the wake delay criterion is not satisfied. The third operation 1126 is performed with delay if the wake criterion is satisfied, such delay, for example, being a specific duration or until cessation of the condition satisfying the wake delay criterion.

Figure 12:
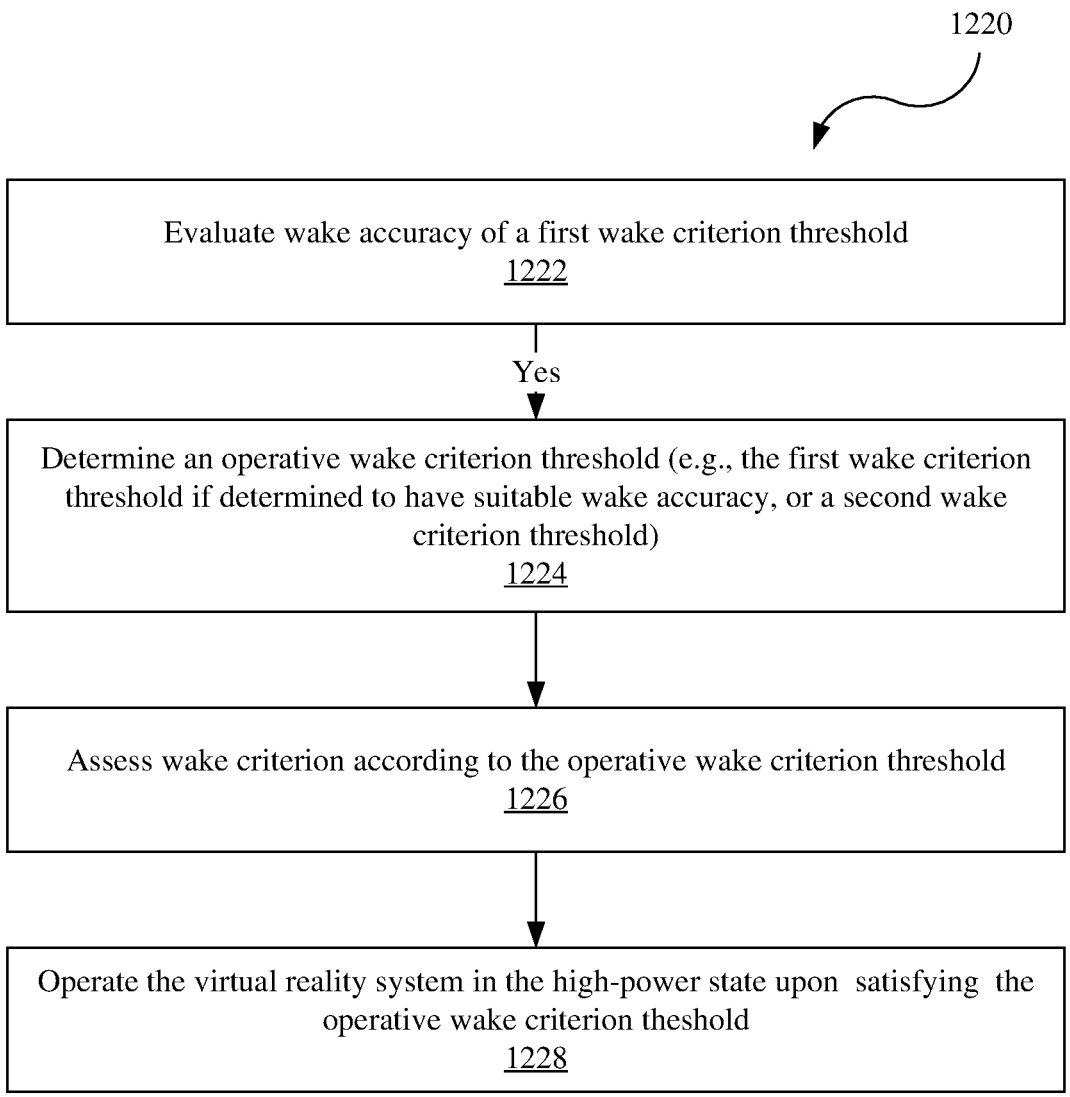
FIG. 12 is a flowchart of another method for determining whether to operate the display system in the high-power state.

Referring to FIG. 12, the wake control system 200 may adjust sensitivity to one or more of the wake criteria. For example, a wake criterion may be satisfied when a value of the sensed condition exceeds a wake criterion threshold that may be varied to increase or decrease sensitivity thereof. Such wake criterion thresholds may, for example, include a speed (e.g., speed of eye blinking, eye movement, or head movement), a duration (e.g., of movement pattern, eye closing, eye position, head position), and/or a magnitude (e.g., eye angle or head angle, or volume).

The wake control system 200 may determine a wake criterion threshold for the user (e.g., adjust sensitivity of the wake criterion), which has suitable sensitivity for a given user (e.g., does not cause operation in the high-power state on too many or too few occurrences). For example, the wake control system 200 may assess the wake accuracy for a given wake criterion threshold (e.g., a default value) in the manners described with respect to the method 920 (e.g., by assessing behavior of the user after satisfaction of the wake criterion and operating in the high-power state). If the wake criterion threshold has low wake accuracy (e.g., results in operating in the high-power state on too many or too few occurrences), the wake criterion threshold may be adjusted (e.g., upward or downward, respectively) to change sensitivity of the wake criterion and, thereby, improve wake accuracy.

Instead or additionally, the wake control system 200 may observe typical user behavior that might satisfy the wake criteria and result in unwanted operation in the high-power state (e.g., the speed, duration, and/or magnitude of typical behaviors of the user), and determines the criterion threshold accordingly (e.g., to be higher than the typical behavior, so as to limit false positives and low wake accuracy). For example, the wake criterion may be an extended eye blink in which case the wake control system 200 observes the user to normally hold their eye shut for a typical duration for a routine blink, and determines the wake criterion threshold (e.g., a wake blink duration) to be longer than the routine blink duration.

The wake determination may be made according to a method 1220, which includes a first operation 1222 of assessing wake accuracy of a wake criterion threshold, a second operation 1224 of determining an operative wake criterion threshold, a third operation 1226 of assessing the wake criterion according to the operative wake criterion threshold, and a fourth operation 1228 of performing another operation, such as operating in the high-power state, upon satisfaction of the operative wake criterion threshold.

In the first operation 1222, the wake accuracy of a first wake criterion threshold is determined. The wake accuracy for the first wake criterion threshold may be determined according the first, second, and third operations 922, 924, 926 of the method 920 (e.g., evaluating subsequent behavior of the user after using the first wake criterion threshold multiple times to make the wake determination and operation in the high-power state).

In the second operation 1224, if the first wake criterion threshold is determined to be suitably sensitive (e.g., have sufficient or acceptable wake accuracy), the first wake criterion threshold functions as the operative threshold and is continued to be used in subsequent wake determinations. For example, the wake accuracy may be compared to a target value or range of wake accuracy. If the wake accuracy exceeds the target value (e.g., 90%) or is within the range of wake accuracy (e.g., 85% to 95%), the first wake criterion threshold is determined to be the operative wake criterion (e.g., the sensitivity of the wake criterion is not changed). The target values and ranges are non-limiting examples.

The first wake criterion threshold may be too sensitive if the wake accuracy is below the target value or below the bottom end of the range, for example, because of too many occurrences of operating in high-power state. In such case, the wake criterion is made less sensitive, for example, by determining the operative wake criterion threshold to be higher than the first wake criterion threshold.

The first wake criterion threshold may instead be too insensitive if the wake accuracy is above an upper end of the range, which may indicate that the display system 100 is not operated in the high-power state as often as may be desirable to the user. In such case, the wake criterion is made more sensitive, for example, by determining the operative wake criterion threshold to be lower than the first wake criterion threshold.

Instead or additionally, the wake criterion threshold may be determined iteratively (e.g., repeating the operations 1222, 1224 for different wake criterion thresholds to find the wake criterion threshold having greater wake accuracy) and/or periodically (e.g., repeating the operations 1222, 1224 at different times, for example, in case of changed behavior of the user over time).

Instead of or in addition to the operations 1222, 1224, a different operation (not shown in FIG. 12) may be used to determine the operative wake criterion threshold by first observing the user to determine typical conditions (e.g., behavior) of the user that might inadvertently satisfy the wake criterion, and determine the operative wake criterion threshold to exceed typical conditions of the user.

In the third operation 1226, the wake criterion is assessed according to the operative wake criterion threshold (e.g., the observed condition exceeds the operative wake criterion threshold).

In a fourth operation 1228, upon satisfaction of the wake criterion, another operation is performed, such as the third operation 330 of the method 300 by operating the display system 100 in the high-power state. As with the previously disclosed methods, the method 1220 may be performed in conjunction with any of the methods described above.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects. As referenced above, the outputs of the various different types of CGR, may be referred to as CGR content, which may include graphics, audio, and/or outputs related to the other senses.

Examples of CGR include virtual reality and mixed reality.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationary with respect to the physical ground.

Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

The virtual objects and other computer-generated imagery of the VR, MR, AR, and AV environments described above may be considered CGR content.

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

As described above, one aspect of the present technology is the gathering and use of data available from various sources to determine when to operate in a high-power state. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to determine when to operate in a high-power state. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of determining when to operate in a high-power state, the present technology can be configured to allow users to select to "opt in" or "opt out" of participation in the collection of personal information data during a setup operation, or thereafter, for determining when to operate in a high-power state. In another example, users can select not to provide or have monitored personal information, such as eye or head movement, for determining when to operate in a high-powered state. In yet another example, users can select to limit the length of time such movement data is monitored or maintained. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, determining when to operate in the high-powered state based on non-personal information data or a bare minimum amount of personal information, such as making such determination upon explicit request from the user.

What is claimed is:
1. A display system comprising:
a head-mounted display unit for providing content to a user, the head-mounted display unit being operable in a low-power state and a high-power state that consumes more power than the low-power state; and
a wake control system for determining when to operate in the high-power state, wherein the wake control system:
assesses, with a first sensor of the head-mounted display unit, satisfaction of a first wake criterion using a first amount of power,
upon satisfaction of the first wake criterion, assesses, with a second sensor of the head-mounted display unit, a user behavior to determine satisfaction of a second wake criterion using a second amount of power greater than the first amount of power, wherein the second wake criterion is one of an eye gaze criterion or a head movement criterion,
assesses, with a third sensor of the head-mounted display unit configured to sense a physical environment of the head-mounted display unit, an environmental stimulus that induces the user behavior to determine satisfaction of a third wake criterion using a third amount of power greater than the first amount of power, wherein the third wake criterion is one of a sound criterion or a visual criterion, and causes, with a controller, the head-mounted display unit to operate in the high-power state upon determining satisfaction of the second and third wake criterions.

2. The display system according to claim 1, wherein the wake control system includes a wake sensor device and the controller;

wherein the wake sensor device includes the first sensor, assesses the first wake criterion with the first sensor independent of the controller, and sends a wake control signal to the controller upon satisfaction of the first wake criterion; and wherein the controller initiates the wake control system to assess the second wake criterion upon receipt of the wake control signal and causes the head-mounted display unit to operate in the high-power state.

3. The display system according to claim 2, wherein the wake sensor device includes the first sensor for sensing a first wake condition, a processor that compares the first wake condition to the first wake criterion to determine whether the first wake criterion is satisfied, and a communications interface by which the wake sensor device sends the wake control signal to the controller.

4. The display system according to claim 3, wherein the wake sensor device compares the first wake condition to a plurality of first wake criteria that includes the first wake criterion, and sends the wake control signal upon satisfaction of any of the first wake criteria.

5. The display system according to claim 4, wherein the first wake criteria are selectable by the user.

6. The display system according to claim 4, wherein the controller evaluates wake accuracy of the first wake criteria.

7. The display system according to claim 2, wherein the first wake criterion is one of a sound criterion or a movement criterion.

8. The display system according to claim 1, wherein the wake control system further assesses the second wake criterion at a different frequency according to a probabilistic condition.

9. The display system according to claim 8, wherein the probabilistic condition is one of time of day or location, and the different frequency is relative to another frequency at another time of day or another location.

10. The display system according to claim 1, wherein the head-mounted display unit outputs graphical content in the low-power state, and the head-mounted display unit consumes more power to output the graphical content in the high-power state than in the low-power state.

11. The display system according to claim 10, wherein in the low-power state, the graphical content includes graphics that are output by the head-mounted display unit spatially-independent of a real environment of the user, and in the high-power state, the graphical content includes other graphics that are output by the head-mounted display unit spatially associated with the real environment.

12. The display system according to claim 10, wherein in the high-power state, the graphical content is output by the head-mounted display unit at a higher frame rate than in the low-power state.

13. The display system according to claim 1, wherein the second wake criterion is satisfied if a direction of one of an eye gaze or a head movement correspond to a direction of the one of the sound criterion or the visual criterion.

14. The display system according to claim 1, wherein the wake control system determines to not operate in the high-power state upon satisfaction of both the second wake criterion and the third wake criterion.

15. The display system according to claim 1, wherein satisfaction of the third wake criterion confirms satisfaction of the second wake criterion.

16. The display system according to claim 1, wherein the environmental stimulus is a visual stimulus and the user behavior is an increase in a pupil diameter.

17. The display system according to claim 1, wherein the environmental stimulus is a visual stimulus and the user behavior is an eye gaze direction.

18. The display system according to claim 1, wherein the user behavior includes an eye blinking condition that includes one or more of an eye blinking pattern, successive eye blinks, an extended eye blink, and a blink of only one eye of a user.

19. A display system comprising:

a head-mounted display unit for providing content to a user, the head-mounted display unit being operable in a low-power state and a high-power state that consumes more power to provide the content to the user than the low-power state; and a wake control system for determining when to operate in the high-power state by first assessing satisfaction of a first wake criterion using a first amount of power with a first sensor of the head-mounted display unit, second assessing a user wake criterion with a second sensor of the head-mounted display unit, and third assessing an environmental wake criterion with a third sensor of the head-mounted display unit;

wherein the second sensor senses one of an eye gaze condition or a head movement condition of the user for assessing the user wake criterion, and the third sensor senses an environmental stimulus that pertains to a real environment of the user for assessing the environmental wake criterion and influences the one of the eye gaze condition or the head movement condition used to determine satisfaction of the user wake criterion; and wherein one of the first sensor or the second sensor consumes more power.

20. The display system according to claim 19, wherein the wake control system causes the head-mounted display unit to operate in the high-power state upon satisfaction of the user wake criterion and the environmental wake criterion.

21. The display system according to claim 20, wherein the environmental wake criterion is satisfied by non-occurrence of the environmental stimulus.

22. The display system according to claim 19, wherein the user wake criterion is one of the eye gaze condition or the head movement condition, and the environmental wake criterion is one of a sound criterion or a visual criterion.

23. The display system according to claim 22, wherein the environmental wake criterion is the visual criterion.

24. The display system according to claim 19, wherein the eye gaze condition includes an eye blinking condition that includes one or more of an eye blinking pattern, successive eye blinks, an extended eye blink, and a blink of only one eye of a user.

25. A method for operating changing operation of a head-mounted display unit between a low-power state and a high-power state, the method comprising:

assessing, with a first sensor of the head-mounted display unit, satisfaction of a first wake criterion using a first amount of power, upon satisfaction of the first wake criterion, assessing, with a second sensor of the head-mounted display unit, a user behavior to determine satisfaction of a second wake criterion using a second amount of power greater than the first amount of power;

assessing, with a third sensor of the head-mounted display unit configured to sense a physical environment of the head-mounted display unit, an environmental stimulus that influences the user behavior related to the second wake criterion to determine satisfaction of a third wake criterion using a third amount of power greater than the first amount of power; and causing, with a controller, the head-mounted display unit to operate in the high-power state upon satisfaction of the second and third wake criterions;

wherein the head-mounted display unit outputs graphical content in the low-power state and in the high-power state that requires higher power consumption than in the low-power state.

26. The method according to claim 25, wherein the head-mounted display unit includes a wake sensor device having the first sensor, a processor, and a communications interface, the method further comprising sending, with the communications interface, a wake control signal upon satisfaction of the first wake criterion; and wherein the head-mounted display unit further comprises the controller that, upon receipt of the wake control signal, causes the second sensor to perform the assessing of the second wake criterion.

27. The method of claim 25, wherein the environmental stimulus is a visual stimulus and the user behavior is an eye gaze direction.

28. The method of claim 25, wherein assessing the environmental stimulus occurs prior to assessing the user behavior and after satisfaction of the first wake criterion.

29. The method according to claim 25, wherein the environmental stimulus is a visual stimulus and the user behavior is an increase in a pupil diameter.

30. The method according to claim 25, wherein the environmental stimulus is an aural stimulus and the user behavior is a head movement criterion defined as a head movement away from or toward the aural stimulus.

* * * * *